US011532876B2

(12) United States Patent
Lalos et al.

(10) Patent No.: US 11,532,876 B2
(45) Date of Patent: Dec. 20, 2022

(54) MULTI-PURPOSE SMART TOWER

(71) Applicants: Dimitrios Lalos, St. Charles, IL (US);
Alex J. Lalos, St. Charles, IL (US)

(72) Inventors: Dimitrios Lalos, St. Charles, IL (US);
Alex J. Lalos, St. Charles, IL (US)

(*) Notice: Subject to any disclaimer, the term of this patent is extended or adjusted under 35 U.S.C. 154(b) by 44 days.

(21) Appl. No.: 17/337,754

(22) Filed: Jun. 3, 2021

(65) Prior Publication Data
US 2021/0367331 A1 Nov. 25, 2021

Related U.S. Application Data

(63) Continuation of application No. 16/354,971, filed on Mar. 15, 2019, now Pat. No. 11,075,454.

(60) Provisional application No. 62/643,441, filed on Mar. 15, 2018.

(51) Int. Cl.
| | |
|---|---|
| *H04W 88/08* | (2009.01) |
| *H01Q 1/44* | (2006.01) |
| *F21S 9/02* | (2006.01) |
| *G06F 3/041* | (2006.01) |
| *G06F 3/14* | (2006.01) |
| *G06Q 20/18* | (2012.01) |
| *H01Q 1/12* | (2006.01) |
| *H01Q 1/42* | (2006.01) |
| *G06V 20/52* | (2022.01) |

(52) U.S. Cl.
CPC .............. *H01Q 1/44* (2013.01); *F21S 9/02* (2013.01); *G06F 3/041* (2013.01); *G06F 3/1446* (2013.01); *G06Q 20/18* (2013.01); *G06V 20/52* (2022.01); *H01Q 1/1242* (2013.01); *H01Q 1/42* (2013.01); *H04W 88/08* (2013.01)

(58) Field of Classification Search
CPC .......... H01Q 1/44; H01Q 1/1242; H01Q 1/42; G06F 3/1446; H04W 88/08; H04W 4/80
See application file for complete search history.

(56) References Cited

U.S. PATENT DOCUMENTS

| | | | |
|---|---|---|---|
| 6,173,537 B1 | 1/2001 | Davidsson et al. | |
| 8,382,387 B1 | 2/2013 | Sandoval | |
| 8,842,156 B1 | 9/2014 | Alekhin | |
| 9,698,477 B1 | 7/2017 | Jabara et al. | |
| 9,837,698 B2 | 12/2017 | Lasier et al. | |
| 10,008,119 B2 | 6/2018 | Willborn | |
| 10,203,924 B2 | 2/2019 | Hong | |
| 10,212,271 B1 | 2/2019 | Rosenthal | |
| 10,224,594 B2 * | 3/2019 | Norrell | H01Q 1/1242 |
| 10,292,305 B2 | 5/2019 | Greubel | |
| 10,302,885 B2 | 5/2019 | Morris | |

(Continued)

FOREIGN PATENT DOCUMENTS

WO 2017021853 2/2017

*Primary Examiner* — Said M Elnoubi
(74) *Attorney, Agent, or Firm* — Taft Stettinius & Hollister LLP

(57) ABSTRACT

The present invention relates to a tower comprising multi-function smart node and interactive kiosk for use with a modular, multipurpose tower, to be used in smart city applications, citywide Wi-Fi deployments, video surveillance applications, environmental sensors and other communication venues (wired or wireless) involving wireless network deployments of various wireless technologies. The tower includes modular compartments that can be configured for multiple applications and a central support pole.

22 Claims, 24 Drawing Sheets

(56) References Cited

U.S. PATENT DOCUMENTS

| | | |
|---|---|---|
| 2011/0103274 A1 | 5/2011 | Vavik |
| 2012/0324245 A1 | 12/2012 | Sinha et al. |
| 2013/0044488 A1 | 2/2013 | Hreish |
| 2013/0293877 A1 | 11/2013 | Ramer et al. |
| 2013/0297212 A1 | 11/2013 | Ramer et al. |
| 2014/0259978 A1 | 9/2014 | Walton |
| 2014/0354821 A1 | 12/2014 | Monroe |
| 2015/0052452 A1 | 2/2015 | Alekhin |
| 2015/0349399 A1 | 12/2015 | Lasier et al. |
| 2015/0358807 A1 | 12/2015 | Gorey et al. |
| 2015/0380805 A1 | 12/2015 | Arranz |
| 2017/0122546 A1 | 5/2017 | Abbott et al. |
| 2017/0237146 A1 | 8/2017 | Dureja |
| 2017/0279187 A1* | 9/2017 | Lockwood ............... H01Q 1/42 |
| 2017/0324154 A1 | 11/2017 | Hendrix et al. |

* cited by examiner

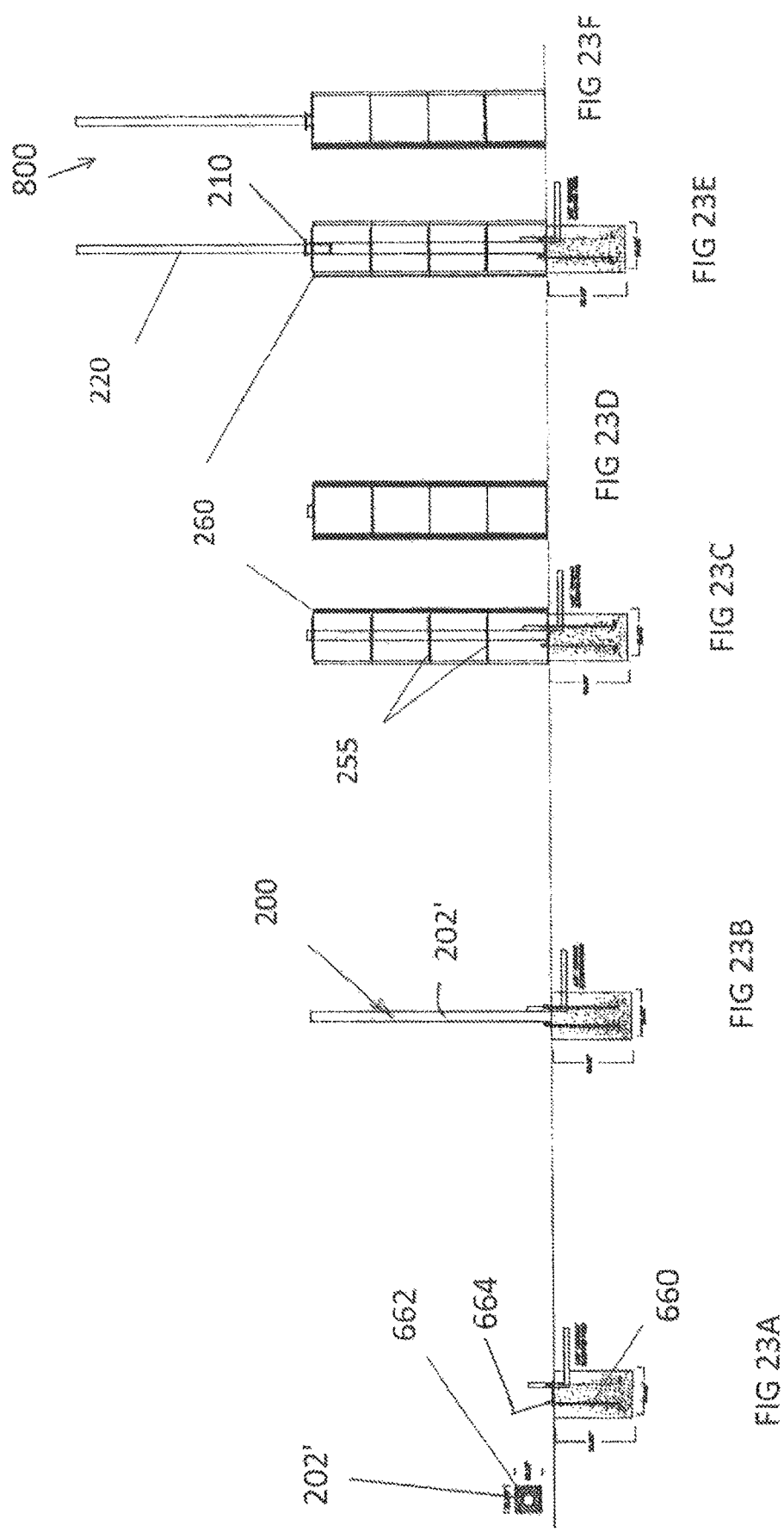

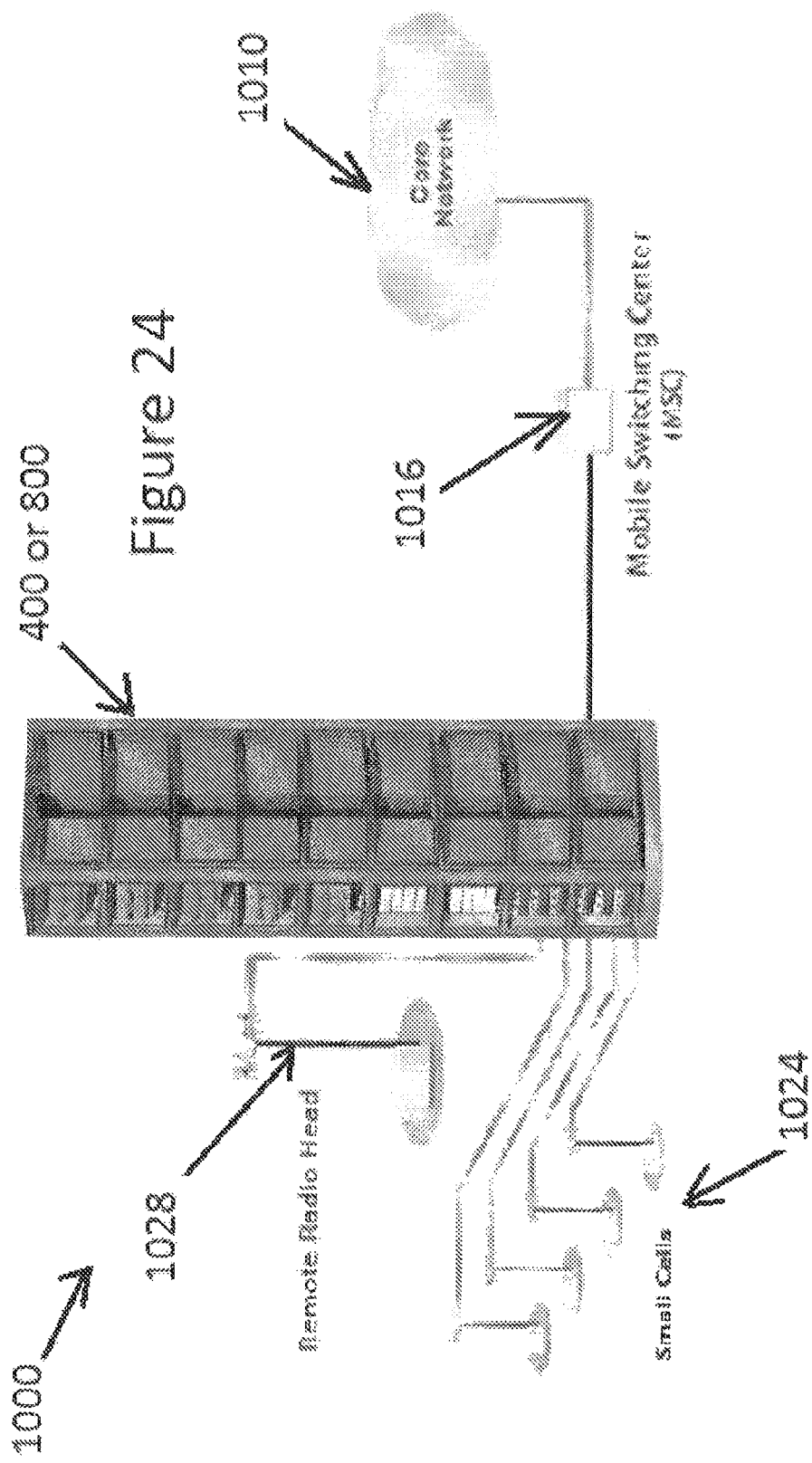

MULTI-PURPOSE SMART TOWER

RELATED APPLICATIONS

This application is a continuation of U.S. patent application Ser. No. 16/354,971 filed Mar. 15, 2019, which claims the benefit of and priority to U.S. Application No. 62/643,441 filed Mar. 15, 2018, which are hereby incorporated by reference.

BACKGROUND

An interactive kiosk is a computer terminal which features hardware and software designed to access information or applications related to the location of the kiosk. The use of interactive kiosks can range from information services, commerce, advertising, education, or entertainment. Traditionally interactive kiosks are placed in locations of heavy foot traffic such as community centers, bus or train stations, malls or other commercial locations.

Currently, many large cities have begun investing into various ways to improve cellular coverage, Wi-Fi, and interactivity for citizens. These are often referred to as "smart city applications." These applications however, rely on two different more traditional approaches. The first is the implementation of many small cell radio access nodes generally reliant on favorable building facades or street lights. The latter can be done in several ways such as overhauling current street lights to allow for small cells to be installed on the pole, or by installing a fixture to the arm of the pole.

A way to improve these systems is with the implementation of multi-purpose interactive kiosks located in areas of high foot traffic. Interactive kiosks can allow for greater connectivity through direct internet access, usually via underground fiber cables connected to the kiosks, and can be fitted with wireless access nodes. This is limited however as radio coverage is minimized due to the height of the kiosks containing the radiating elements of the antennas forcing cellular operators to minimize RF power to avoid high radiation signals to humans, especially in the millimeter wave frequencies.

The implementation of this technology can be difficult and slow, typically performed during the process of upgrading old technologies to new. To improve cellular coverage, older street lights need to either be retrofitted for the new equipment or new poles need to be installed to withstand the additional equipment weight. This can be an expensive and long process. Most interactive kiosk systems do not serve multifunctional needs to improve connectivity and wireless access, cellular systems in particular. Rather, they are designed for a singular purpose of a business or city utility. Because of this, new interactive kiosks must be purchased and installed in place of currently existing systems which again can be a costly proposition.

The present inventors have recognized that a need exists to house most of the BSS elements and some of the traditional cell site elements into a dedicated space in a building in close proximity to the edge of the network.

The present inventors have recognized that a need exists for an improved system which merges all these functions into a single platform without the requirement to replace or overhaul currently deployed appliances or systems.

Cellular systems employ several architectural designs to provide connectivity from the Mobile Switching Center (MSC) to the cell sites (edge of the network). The MSC is the centerpiece of a network switching subsystem. The MSC is mostly associated with communications switching functions, such as call set-up, release, and routing. The MSC is connected with the cell site's base station subsystem (BSS) via a fiber optics or point to point microwave link. The BSS is responsible for managing resources into the radio network. To achieve minimization of resources in the outer edges of the network it is proposed to convert light signals (via fiber) to RF signals at the end point (cell site).

The present inventors have recognized that there is a desire to deploy resources where resources can be easily managed.

The present inventors have recognized that newer technologies, such as 5G, and more advanced edge network implementations may require that more radio resources are brought out at the street level.

Some examples of systems are disclosed in U.S. Pat. Nos. 6,173,537; 9,837,698 and 8,842,156; and US Published patent applications 2017/0279187; 2012/0324245; 2013/0044488; 2015/0380805; 2014/0354821; 2013/0293877; 2013/0297212; 2015/0358807; 2017/0324154. All of these prior art references are hereby incorporated by reference to the extent that they are not inconsistent with the present disclosure.

SUMMARY

An exemplary embodiment of the present invention provides for a smart tower including a multifunction smart node and interactive kiosk housed on or within the tower. The tower can incorporate cellular edge network connectivity, sensors, wi-fi access, etc. The smart tower can replace current smart city solutions by an integrated unit. The exemplary embodiment of the present invention can provide a multifaceted apparatus which establishes the fundamental elements of a mobile communications network node. Specifically, this mobile communications network can utilize a variety of cellular technology solutions such as macro, mini, micro, small cell equipment with antennas mounted at, or near, the highest point of the tower through which a cellular and Wi-Fi signal may be maintained for voice and data for longer distances. In addition, the mobile communications network can be coupled with smart city applications allowing for cellular and Wi-Fi communications in a variety of ways including, but not limited to, Internet access, phone calls, security monitoring, urban wayfinding, providing environmental sensor information to the city's utilities, etc.

According to one embodiment of the invention, the tower comprises modular housing units of varying sizes. It is designed in such a way as to allow for additional housing units to be added or subtracted to increase or decrease the height of the tower. It is also designed to allow for the increase or decrease of the footprint of the equipment mounted on the structure.

For example, three distinct cellular carriers can each place equipment on a designated shelf within a housing unit. A further enhancement of the design allows for the conversion of two shelves into one, or three shelves into one within the tower in the event a cellular carrier would like to increase capacity by upgrading their equipment to a larger envelop or increase the power from a small cell to a medium cell power thus increasing the coverage area served. Similarly, the top compartments containing radiating elements such as antennas can be varied in size based on the frequency and length of the antenna elements. Also, the tower can be configured in a multiplicity of methods and architectures to serve as an edge networking facility for a cellular network. In this configuration all space inside the tower could be converted to appropriately include only baseband radio systems and networking equipment. Baseband radio systems are the portion of the radio systems that does not include the power amplifier.

According to one embodiment of the invention, three of the aforementioned housing units can be substantially identical in dimensions and can be arranged in any order. One of the three units is designed to house the interactive kiosk monitor and all associated electrical equipment. As a result, this unit will have mounting holes in the top and bottom for a support pole but otherwise no intermediate shelves, for making maximum free volume available.

Each of the housing units or sections can have removable side panels.

According to one exemplary embodiment of the invention, side panels can be removed or otherwise opened to allow for access from all sides, used for installation and maintenance. One or more side panels, front and/or the back panels can be replaced by a display screen(s). It is advantageous to use front and back screens, or opposite side screens for marketing digital billboards serving both directions of highway or pedestrian traffic. It is also possible to install LCD or similar displays on all four sides of the smart tower to provide guidance and information to foot or vehicular traffic. Advertising is a way to offset the capital requirement of erecting these smart towers.

The support pole mentioned above can be the specified length required of the tower and could consist of two interlocking poles. These two interlocking poles can comprise two distinct poles of varying diameters. The first pole can be similar to a wooden utility pole designed as the base of the structure and can be planted several feet underground and extend upward into the tower, to the bottom of the final (top) housing unit. An alternate embodiment includes a concrete foundation or slab where the bottom of the first pole includes a flange or baseplate attached by anchor bolts to the foundation or slab.

The two interlocking poles can be connected together with a support plate or connection. The top portion of the interlocking poles can extend to the top of the tower. This second interlocking pole can be of a smaller diameter allowing for additional space for equipment mounting near the top of the tower. Cellular and Wi-Fi antennas can be mounted at the highest point of a tower, allowing for improved signal propagation and less obstructions of line-of-sight. The additional height of the tower as compared to existing street pole or utility pole installations would then allow for added range and coverage. Material of the top section of the tower can be of RF friendly and rigid material, such as polycarbonate.

In addition to the support pole mounting holes, the unit will have a second channel running throughout the structure. The larger central hole, in the middle of the structure, can be designed specifically for structural integrity, while the second smaller opening can be for cabling and heat management purposes. This channel can serve to run fiber, power, and Ethernet cables to the appropriate equipment in the tower from the bottom up. The bottom portion of the tower can accommodate connections such as commercial power or fiber-optics from beneath the tower. All power and fiber can be trenched underground to each location and would run throughout the tower itself thus presenting an esthetically pleasing structure. Integrated panels attached over the compartmentalized modular units of the tower would be esthetically pleasing, illuminated by the utilization of smart technologies such as LEDs. The variation of colors and illumination during the night will provide a product visually pleasing to the public but also achieving full functionality for smart city applications. The removable panels can be painted or designed to exhibit graphics (vinyl glued to the panel or printed directly into the panel) such as pictures, suiting the venue of the application served.

The smart tower of the embodiments of the invention can include the following functions, enhancements and/or advantages:

combining the services of a small/medium cell with an interactive kiosk, surveillance cameras, and Wi-Fi access point into a singular, smart tower, and/or a modular smart tower, and/or a multi-purpose smart tower;

the tower can be integrated with an interactive screen.

the tower can be integrated with a smart node such as a managed switch or computing device;

the tower can provide an enclosure containing components supporting a multifunctional purpose;

the tower can provide an enclosure with removable access panels along the front and back of the tower;

the tower can provide access to the interactive screen components;

the tower can be configured with a supporting pole and a mechanical attachment of the supporting pole with the top of the tower to solidify the structural integrity of the tower;

the tower can provide space for a structural support pole to run in the interior space of the tower;

the tower can be coupled with commercial power, fiber optics connections and proposed distribution running through the space provided within the interior of the tower;

the tower can include a macro/mini/micro/small cell antenna on one of the support poles conforming to existing small cell products;

alternatively, the tower can be independent of a macro/mini/micro/small cell functionality;

the tower can network a macro/mini/micro/small cell functionality with a Wi-Fi access point via a managed switch residing inside the tower;

the tower can network a macro/mini/micro/small cell with a fiber optics circuit via a managed switch within the tower;

the tower can network a macro/mini/micro/small cell with a Point-to-Point radio via a managed switch within the tower;

the tower can network a macro/mini/micro/small cell with a surveillance camera via a managed switch residing inside the tower;

the tower can network a macro/mini/micro/small cell with smart city sensors via a managed switch within the tower;

the tower can network the Wi-Fi access point with a fiber optics circuit via a managed switch residing inside the tower;

the tower can network the Wi-Fi access point with a fast Ethernet network via a managed switch residing inside the tower;

the tower can network the Wi-Fi access point with a surveillance camera via a managed switch residing inside the tower;

the tower can network the Wi-Fi access point with a Point-to-Point radio via a managed switch residing inside the tower;

the tower can network the environmental sensors with a fiber optics circuit via a managed switch residing inside the tower;

the tower can network the environmental sensors with a fast Ethernet network via a managed switch residing inside the tower;

the tower can network environmental sensors with a Point-to-Point radio via a managed switch residing inside the tower;

the tower can network all smart node elements via a managed switch within the tower; the networking protocol or techniques could use currently available VLAN or OSPF techniques;

the tower can direct local network traffic into the fiber optics circuit originating from a surveillance camera and directing traffic via a small cell for monitoring;

the tower can direct network traffic into a fast Ethernet network originating from a surveillance camera and directing traffic via the small cell for monitoring;

the tower can direct network traffic into the Point-to-Point microwave network originating from a surveillance camera and directing traffic via the small cell for monitoring, utilizing a managed switch within the tower;

the tower can direct network traffic into the small cell originating from environmental sensor data via a managed switch within the tower;

the tower can direct local network traffic into the Wi-Fi network originating from environmental sensor data via a managed switch within the tower;

the tower can direct local network traffic into the Point-to-Point microwave network originating from environmental sensor data via a managed switch within the tower;

modular or segmented housing units can be stacked on top of one another in the creation of a singular structure;

all modular or segmented housing units can be securely connected to one another in a stacked arrangement;

modular or segmented housing units can be added or subtracted to the tower structure as necessary;

shelving in the modular or segmented housing units can be added or subtracted to accommodate equipment needs;

parts of the tower can be illuminated;

illumination of the tower can be customized;

a lit panel can be opened or closed via a hinged mechanism; and the lit panel can be locked or unlocked.

The tower embodiments of the invention being modular can be deployed as a resource in two or more configurations. The fact that is modular and configurable to the needs of the wireless carriers allows the platform to be configured in a multiplicity of configurations before or after initial deployment. For example the tower can be converted from containing radiating elements like antennas to a smart tower containing only networking and radio elements.

The tower also provides a solution to prior art drawbacks by maximizing elevation of radiating elements and achieving maximum coverage.

Numerous other advantages and features of the present invention will be become readily apparent from the following detailed description of the invention and the embodiments thereof, and from the accompanying drawings.

BRIEF DESCRIPTION OF THE DRAWINGS

FIGS. 23A-23F are schematic diagrams of construction steps for the erection of the tower of FIG. 13; and FIG. 24 is a schematic diagram of an Edge Networking Configuration for a cellular network, according to another aspect of the invention.

DETAILED DESCRIPTION

Figure 1:
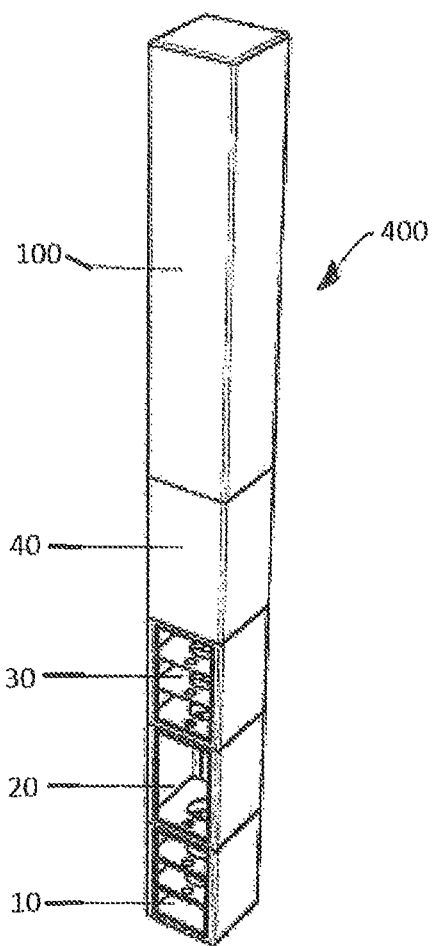
FIG. 1 is a perspective view of a tower of the present invention shown without internal equipment of the support pole, with some panels removed to show the underlying components.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates U.S. provisional patent application Ser. No. 62/643,441, filed Mar. 15, 2018, in its entirety. Additionally, U.S. Pat. Nos. 6,173,537; 9,837,698 and 8,842,156; and US Published patent applications 2017/0279187; 2012/0324245; 2013/0044488; 2015/0380805; 2014/0354821; 2013/0293877; 2013/0297212; 2015/

0358807; 2017/0324154 are all hereby incorporated by reference to the extent that they are not inconsistent with the descriptions of the present disclosure.

Figure 9:
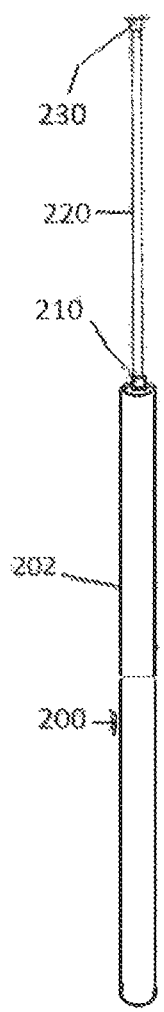
FIG. 9 is a perspective view of a support pole to be used in the tower of FIG. 1.
Figure 10:
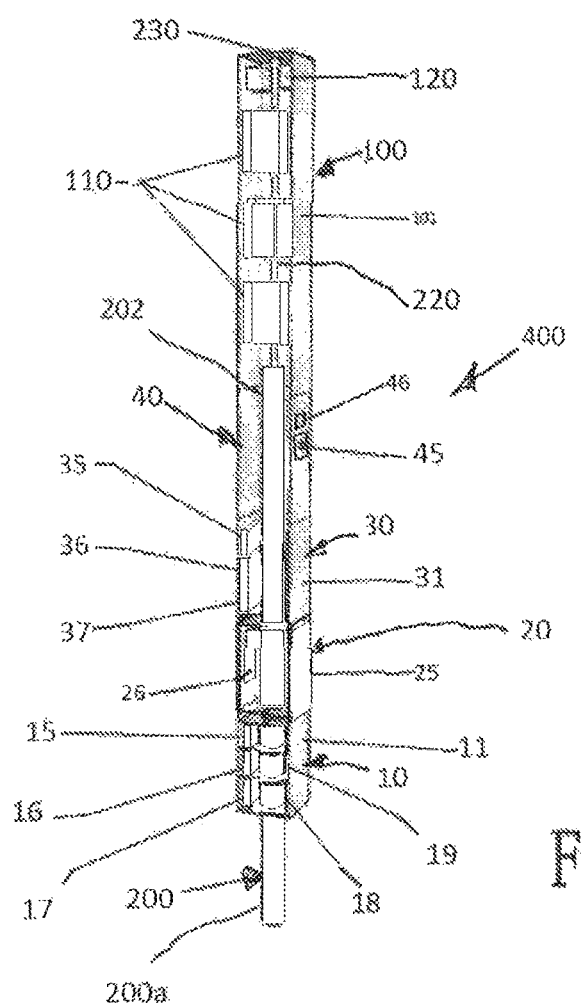
FIG. 10 is a perspective view of internal equipment to be used in the tower of FIG. 1 with panels removed to show underlying components.

FIG. 1 shows a modular tower 400 without any equipment or support pole (FIG. 9) installed. Not shown are three panels or doors which cover bottom sections or compartments of the modular tower 400. Specifically, modular housing unit or section 10 of the modular tower 400 contains three individual shelves to mount power and telecom equipment for circuits installed in the modular tower. Modular housing unit or section 20 provides space for an interactive display screen or "touch screen" 25 and computer equipment 26 (FIG. 10). Modular housing unit or section 30 provides space for cellular equipment. Modular housing unit or section 40 provides space for mounting surveillance cameras and Wi-Fi processing equipment. Modular housing unit or section 100 provides space for antennas.

Figure 2:
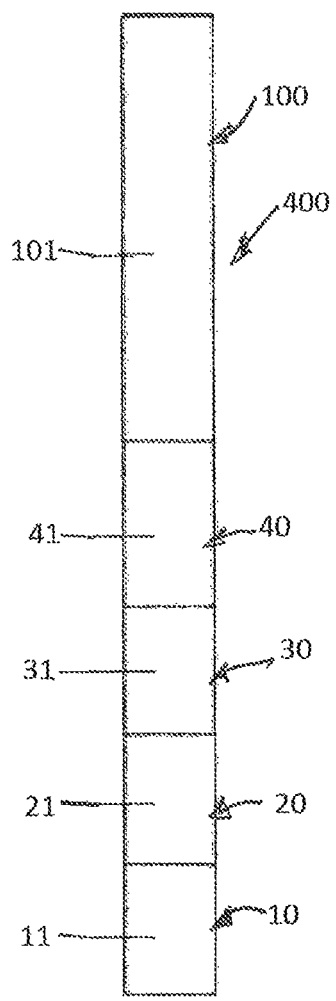
FIG. 2 is a side view of the tower of FIG. 1.

FIG. 2 is a side view of the modular tower 400. In the illustrated embodiment, both sides of the tower can have fixed side panels or sidewalls 11, 21, 31, 41, 101. It should be noted that section 100 and sidewalls 101 can be constructed from composites capable of allowing uninterrupted, and with minimum attenuation, radiated radio signal from an antenna mounted inside the modular tower 400.

Figure 3:
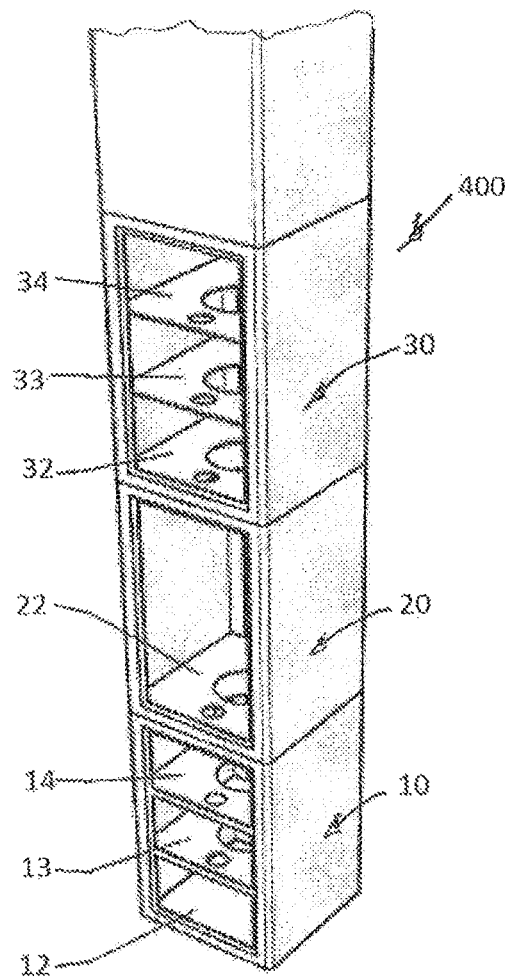
FIG. 3 is an enlarged, fragmentary perspective view taken from FIG. 1.
Figure 4:
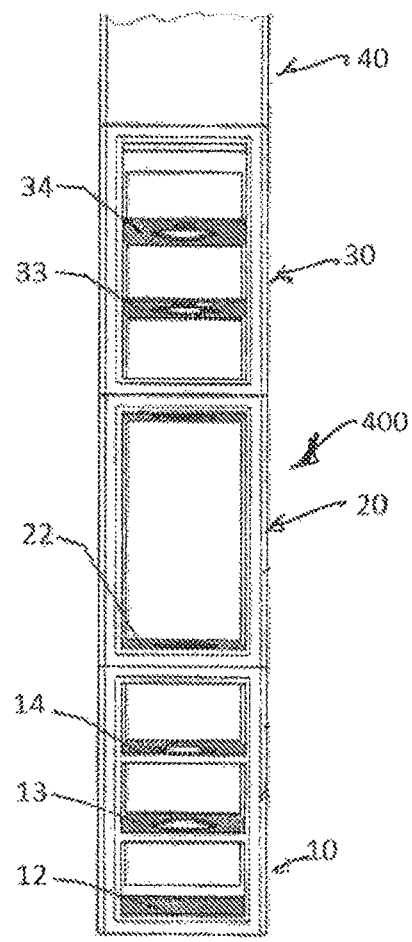
FIG. 4 is an enlarged front view taken from FIG. 1.

FIG. 3 is a pictorial representation of the first three sections (from bottom to top), sections 10, 20, and 30. The FIG. 3 shows that sections 10 and 30 feature a multilevel design for equipment, provided by shelves 12, 13, 14 and 32, 33, 34. Section 20 is a single level provided by shelve 22, where the touch screen and a computer running the touch screen can be housed. FIG. 4 depicts the same sections as FIG. 3, from the front view.

For each section or compartment, the uppermost and lowermost shelves can be considered the top wall and the bottom wall respectively of that section or compartment.

Individual panels or doors 300 (FIG. 11) can be mounted to the front and back to close and protect each individual compartment, defined between shelves, where equipment is to be mounted. It is customary for each cellular provider to occupy their own compartment so they can freely upgrade or maintain their equipment. As a result of this approach, each wireless carrier enjoys privacy and security with the designation of a specific shelf and compartment for each of the wireless carriers. Each individual shelf can be provided with a security lock mechanism, for locking the panel or door 300, to secure the compartment.

The three depicted housing units 10, 20, 30 shown in FIGS. 3 and 4 can be, but need not be, substantially identical in dimensions and can be arranged in any order.

Figure 5:
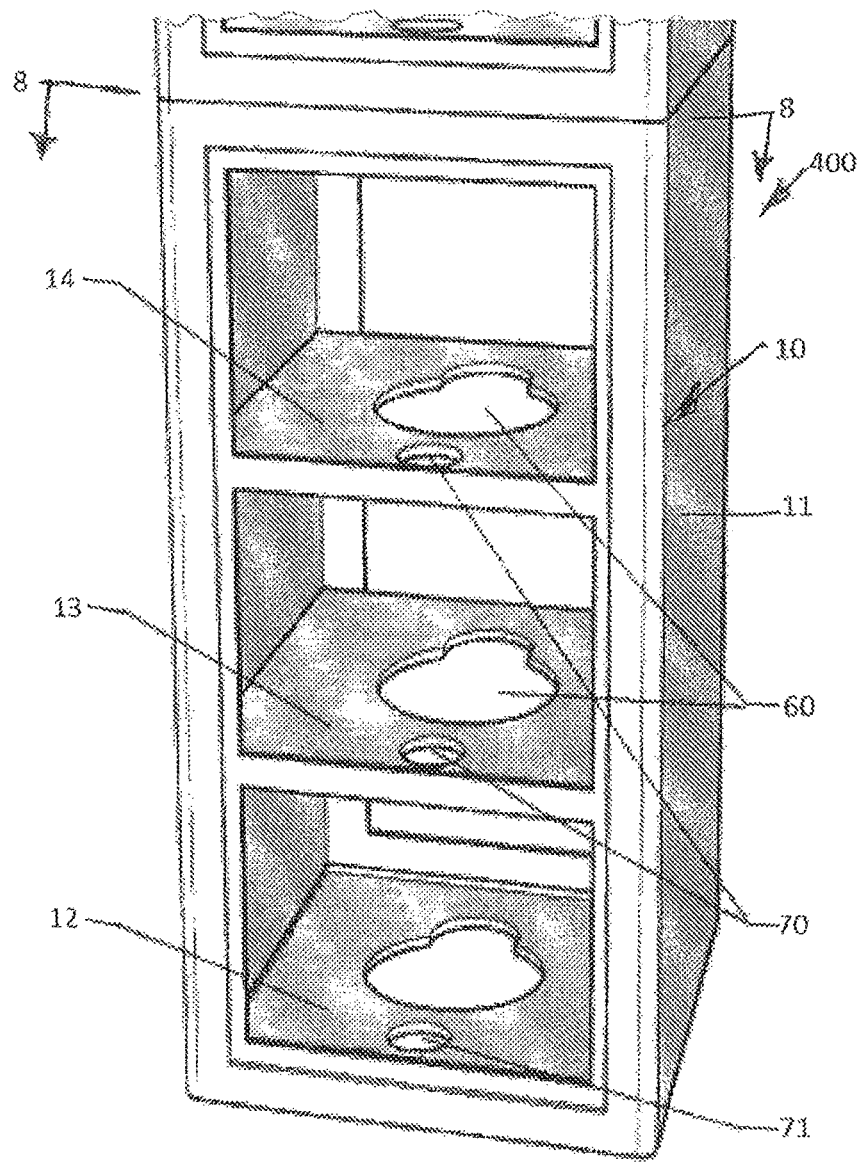
FIG. 5 is an enlarged, fragmentary perspective view taken from FIG. 1.

FIG. 5 is a representation of section 10 showing the shelving pattern and a sequence of openings 60, 70 to accommodate the support of the modular tower 400 and also to accommodate pulling the necessary cabling to power each of the sections. Such cable openings 70 run throughout the interior of the tower. It should be noted that cable opening 71 is used to accept exterior wiring or cabling coming from underneath the tower structure for power and telecom purposes.

Figure 6:
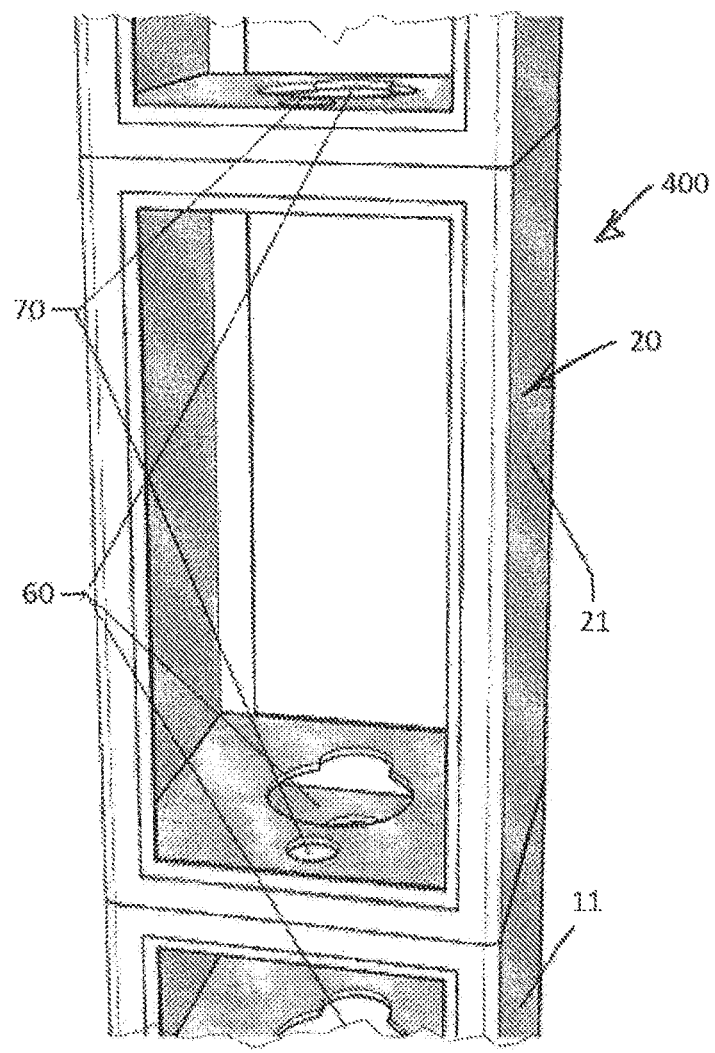
FIG. 6 is an enlarged, fragmentary perspective view taken from FIG. 1.

FIG. 6 is a representation of section 20 that better exhibits the difference between sections 10 and 20. The section 20 can be used for the mounting of computer equipment driving the touch screens 25 used to operate the function of a smart kiosk. Access into the section can be provided from front or back of the section. This unit 20 can have mounting holes in the top and bottom walls for accommodating a support pole but otherwise is free of intermediate shelving.

Figure 7:
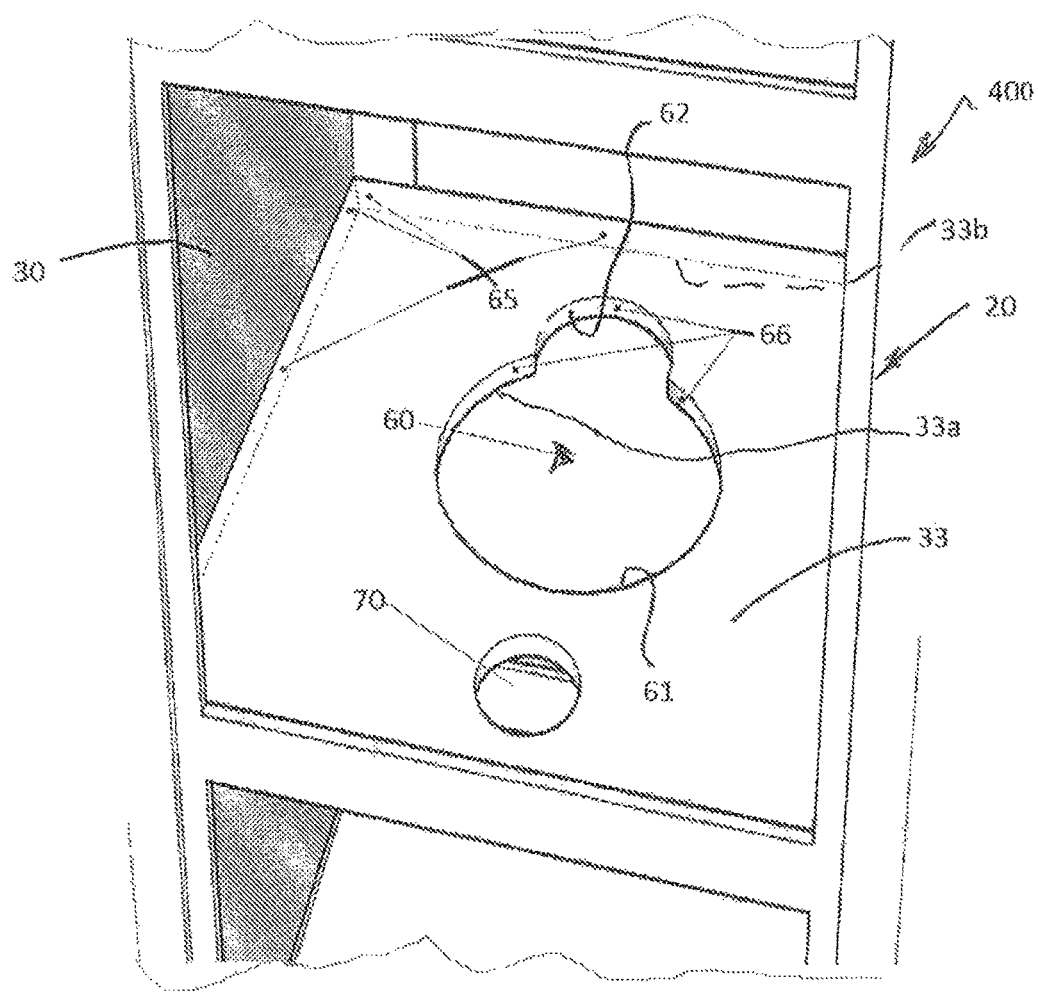
FIG. 7 is an enlarged, fragmentary perspective view taken from FIG. 1.

FIG. 7 is a close-up view of the central, large openings 60 used to accommodate the main structural support, and cabling openings 70 for connecting each section of the modular tower 400. It also represents the structural relationship between the support pole 200 (FIG. 9) fitting into opening 60 with the attachment of screws 66 through the shelf into the pole 200 and the attachment of the shelf 33 to the panels of the section 30 of the smart tower by screws 65. In order to accommodate the screws 65, 66, the shelf 33 has a downward turned rim or flange 33a around the opening 60 and a downward turned rim or flange 33b around the perimeter of the shelf. Some or all of the shelves can have similar downward turned rims around the openings 60, the perimeters of the shelves and also around the opening 70 to strengthen the shelf and to avoid sharp edges. The opening 60 has a substantially circular region 61 to accommodate a cylindrical support pole and can also can include a smaller, contiguous secondary opening region 62 for running fiber and/or cable, power, and Ethernet cables along the support pole.

Some or all of the other shelves 12, 13, 14, 22, 32, 34 can be fastened to the support pole 200 and the panels of the respective section in the same fashion as the attachment of shelf 33 described in FIG. 7.

The openings 70 can serve to run fiber and/or cable, power, and Ethernet cables to the appropriate equipment from the bottom up. The bottom portion of the tower will accommodate connections such as commercial power or fiber-optics from beneath the tower. All power and fiber and/or cable and Ethernet cables can be trenched underground to each location. The power and fiber and/or cable would run through the interior of the tower, thus presenting an esthetically pleasing structure.

Figure 8:
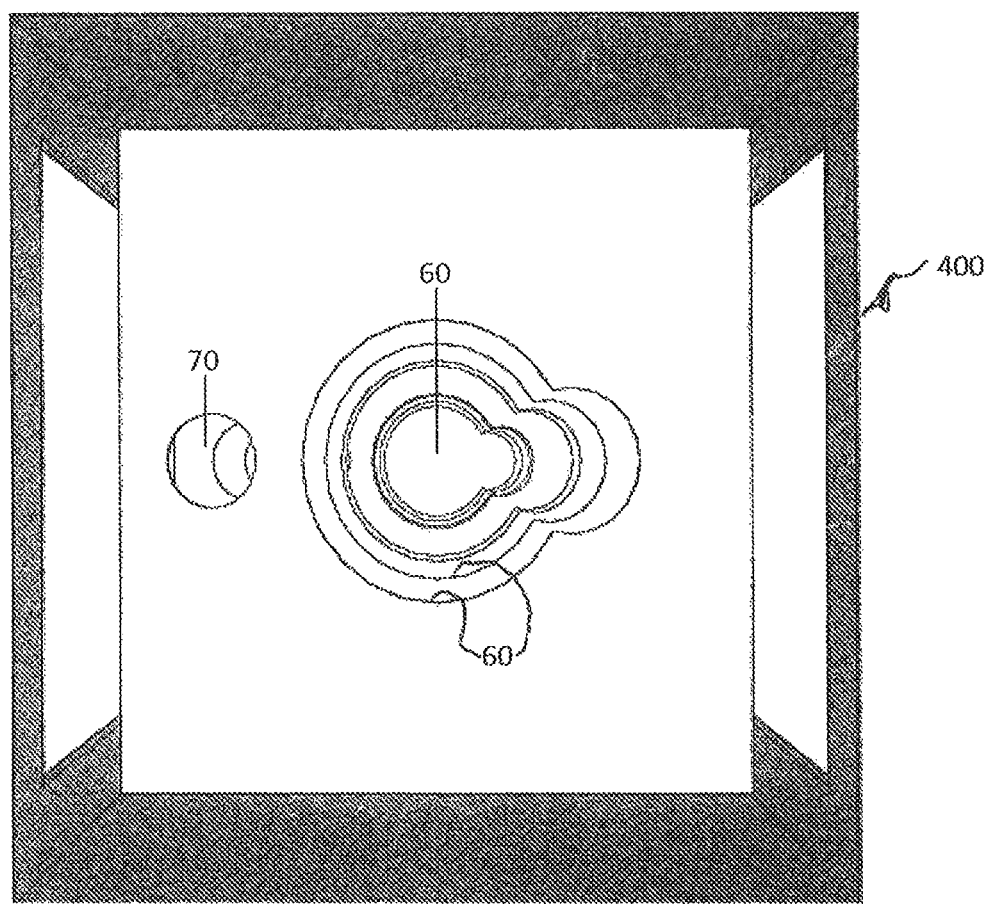
FIG. 8 is a top perspective view taken generally along line 8-8 of FIG. 5.

FIG. 8 is a top perspective view of the inside the modular tower 400 including the openings 60 which are vertically aligned throughout the tower. All openings 60, below the top-level, can be identical in size regardless of the individual section used. It should be noted that the structural integrity of the modular tower 400 is enhanced by the fastening together of each of the sections 10, 20, 30, 40 the shelves 12, 13, 14, 22, 32, 33, 34, 42 and the panels 11, 21, 31, 41 of the modular tower to tie all together as a single structure.

The support pole 200 mentioned above and seen in FIG. 9 will be of a specified length required of the modular tower and would consist of two interlocking poles. These two interlocking poles can be of two distinct poles of varying diameters. A first pole 202 could be similar to a wooden utility pole designed as the base of the structure and will be planted several feet underground and extend through the tower, to the bottom of the final (top) housing unit 100. The two interlocking poles are connected together with a support plate or connection 210. The top portion of a second interlocking pole 220 can extend to the top of the tower. The second interlocking pole 220 could be of a smaller diameter allowing for additional space for equipment mounting near the top of the tower. Small cells and Wi-Fi nodes can be stored at the highest point of the tower allowing for improved signal propagation and less obstructions to line-of-sight. The additional height of the smart pole structure as compared to existing street pole or utility pole installations would then allow for added range and coverage.

As shown in the FIG. 10, a portion 200a of the pole 202 remains in the ground below the tower 400 to provide structural mounting and stability. The pole 202 supports the placement of each sections 10, 20, 30, 40 through the central opening 60 depicted in FIGS. 5, 6, 7 and 8. The pole 202 is connected to the pole 220 by the connection 210 that joins both sections into a single piece. The advantage of this approach is that each of the sections could be from different materials (wood, metal, composite, etc.) to accommodate different structural requirements and needs. Pole 220 is also joined with modular tower 400 via connection 230 on the top of the pole 220, thus providing structural support on the top of the modular tower 400 and rigidity to the overall structure.

FIG. 10 show an example of the fully populated smart tower. The touch screen 25 can be mounted on each side of the tower for interactive information to the consumer and/or as a display functioning as digital marketing billboards serving both sides of highway or pedestrian traffic. Incorporating the kiosk functionality into the smart tower, and to utilize advertising, is a way to offset the capital requirement of erecting these smart towers.

As shown in FIG. 10, the smart tower includes the support poles 202 and 220. Section 10 houses telecom equipment 15, 16, 17, with each compartment defined between shelves which can serve each individual cellular carrier. Power equipment 18, 19 can also be housed in section 10. FIG. 10 also shows computer equipment 26 mounted in, and the touch screen 25 mounted on, section 20. The touch screen 25 replaces a side panel 21. FIG. 10 also shows cellular equipment 35, 36, 37 mounted on each individual shelve of section 30. Surveillance cameras 45 (shown schematically as a box) and Wi-Fi equipment 46 (shown schematically as a box) are mounted in, or on, section 40 while radio antennas 110 are shown mounted on the second pole 220 and are contained within section 100. Advantageously, section 100 walls and structure can be composed of composite material capable of radiating uninterrupted RF signal through the tower. It is also shown that Point-to-Point microwave radios 120 could be mounted on the top section of pole 220 to connect telecom resources to the next telecom entry point if fiber optics or other high speed circuits are not available at the physical location of the modular tower. Thus telecom equipment 15, 16, 17 or some of the positions may not be utilized.

Equipment, such as electrical boxes, components, and antenna, may be attached to the pole 200 and/or to one or more shelves of each section. Attachment may be by fasteners, clamps, clips or other known attachment device or method.

FIG. 10 depicts this installation in which the space available for equipment near the top of the pole is nearly double that of the bottom half where potentially a wooden utility pole could be utilized.

Figure 11:
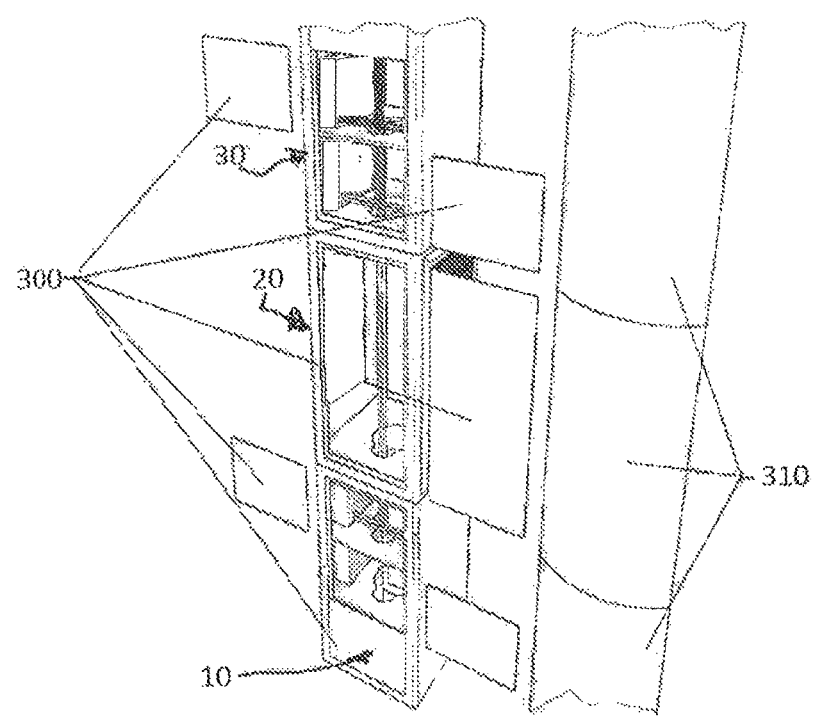
FIG. 11 is a fragmentary, exploded perspective view of the tower of FIG. 1 with panels removed to show underlying components.

FIG. 11 is a pictorial representation of sections 10, 20, 30 with some equipment installed, and wiring and cabling installed in the tower. FIG. 11 depicts access to each of the compartments or sections. Each of the sections can have two or more removable panels: one or more on the front and one or more on the back, used for installation and maintenance.

The doors or panels 300 are also shown to isolate each of the compartments within the sections 10 and 30. The size of the door or panel will match the size of the compartment used, thus allowing to configure each compartment based on needs and configurations, allowing cellular carriers to use the whole compartment for their own use thus increasing the local capacity of the network based on traffic needs and requirements. Panels 310 are installed over each of the sidewalls of the sections or compartments 10, 20, 30 40, and 100 to allow for a uniform one-piece look of the overall structure. Panels 310 could also be installed over the front and back of each section (not shown). To provide an esthetically pleasing structure the panels 310 could be lit with LED lights and could be customized to the venue of the project thus providing for specific colors based on the location chosen. The utilization of smart technologies such as LEDs allows the variation of colors and illumination during the night to provide a product visually pleasing to the public but also achieving full functionality as needed for smart city applications.

The sections 10, 20, 30, 40, 100 can be formed of sheet metal, or composite material, or other appropriate material, and each can form an enclosure with opposite side panels, front and back panels or doors, and top and bottom walls. The section 100 can have side panels and/or front and or back panels at least partially composed of a composite material capable of radiating uninterrupted RF signal through the section 100. The panels can have flanged edges for fastening the sections together and to each other. The openings can be flanged for strength.

Figure 12:
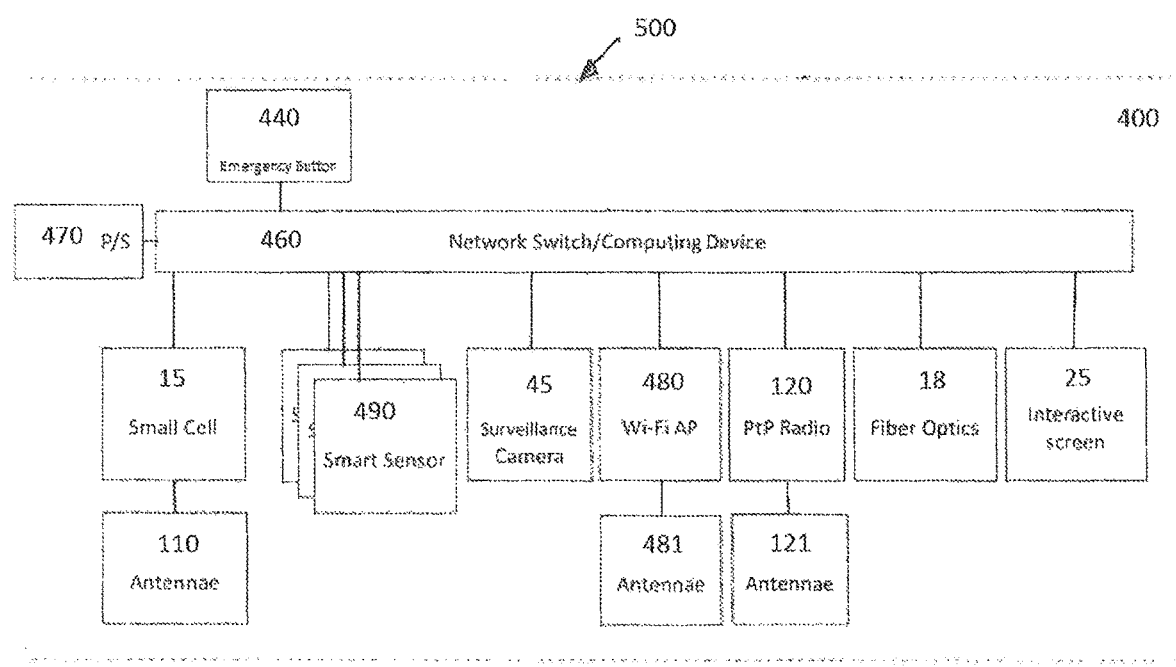
FIG. 12 is a system diagram of a tower system according to one aspect of the invention.

FIG. 12 is a block diagram of a smart tower system 500 including smart node and interactive kiosk, residing inside the modular tower 400. A managed switch 460 receiving power from a power supply 470, is directly connected to the small cell 15 connected to antenna 110, to smart sensors 490, to surveillance camera 45, to Wi-Fi Access Point 480, to Point-to-Point radio 120, to Fiber Optics Circuits 18 and to interactive screen 25. An emergency button 440 can be provided to enable a user to quickly summon police or other emergency agency. The managed Switch/Computing Device routes data communications from the hard assets within the tower to its destination (such as cellular company, municipality/city, Internet, etc.) via any of the available telecom connections (such as fiber, PtP radio, etc.). Antennas 481 and 121 are provided for the Wi-Fi and PtP applications, respectively.

Figure 13:
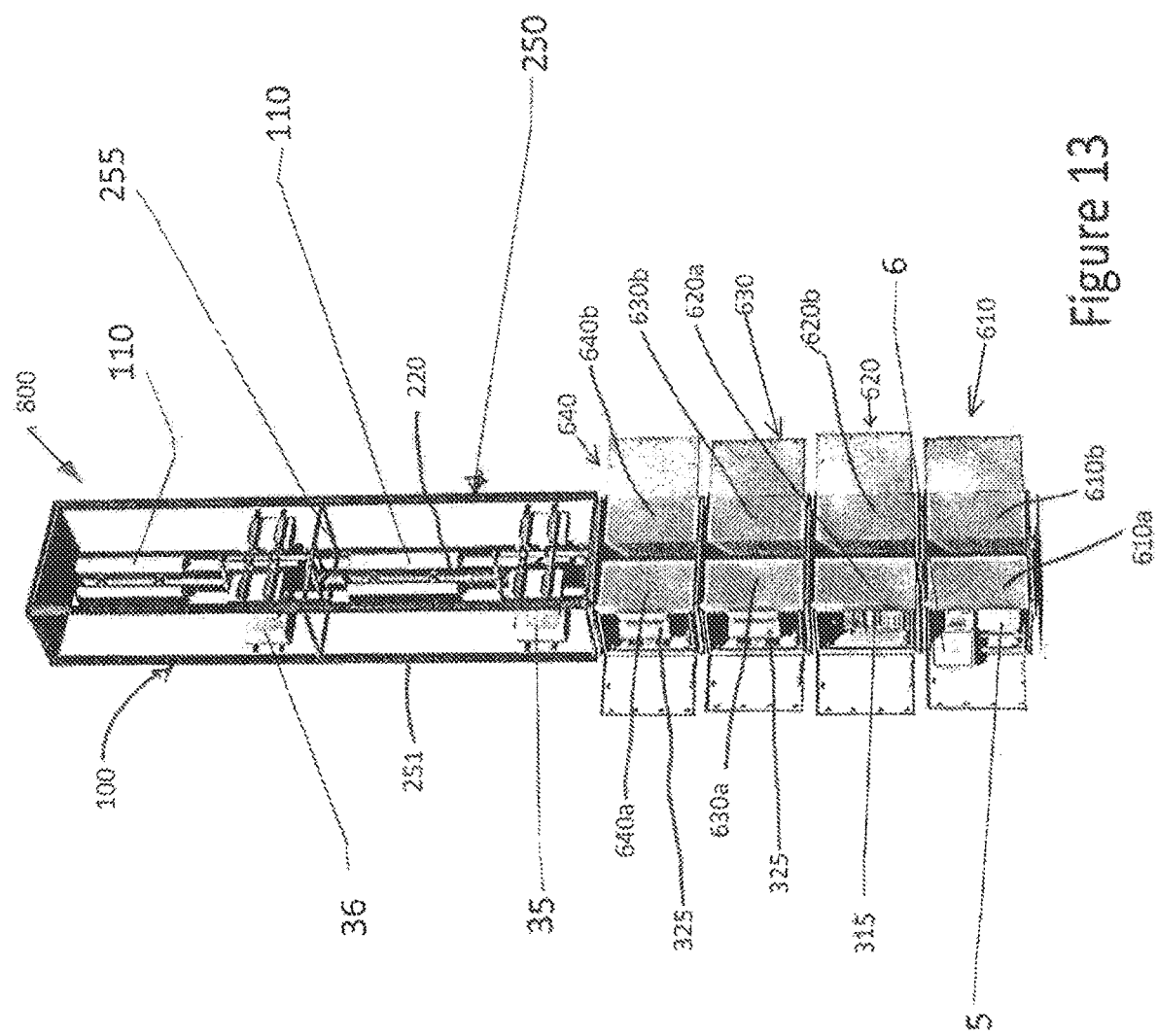
FIG. 13 is a perspective view of an alternate tower shown populated with equipment and with panels removed or opened to show underlying equipment.

FIG. 13 is a pictorial representation of an alternate embodiment tower 800 populated with equipment. The alternate embodiment tower 800 is similar to the tower 400 previously described except as noted. The tower 800 includes lower sections or compartments 610, 620, 630, 640. Sidewalls of the sections 610, 620, 630, 640 are removed in this figure to show underlying components. In a top portion of the tower, antennas 110 are mounted on the upper pole section 220 with associated RF equipment 36 and 35. This option allows for two cellular carriers to use the same tower. One or more horizontal frames 255, such as a metal or polycarbonate frames, are utilized for structural integrity of the overall structure and could be positioned up or down to adjust space between top and bottom antenna positions. A vertical frame 250 can be constructed with spaced-apart columns 251 composed of carbon-fiber material, or similar material, to allow for radio frequency waves to easily penetrate. Removable panels 310 as previously described are attached to the vertical frame 250 (not shown, see FIG. 15).

Back to back electrical boxes 610*a*, 610*b*, 620*a*, 620*b*, 630*a*, 630*b*, 640*a*, 640*b* such as NEMA (National Electrical Manufacturers Associate) 4 boxes, can be slid into the compartments or sections 610, 620, 630, 640.

Power equipment 5, including a breaker panel 6, can be located in the lowest boxes 610*a*, 610*b* in compartment 610. Network switching equipment 315 can be located in boxes 620*a*, 620*b* in compartment 620. Radio equipment racks 325 can be located in boxes 630*a*, 630*b* in compartment 630 and in boxes 640*a*, 640*b* in compartment 640.

Figure 14:
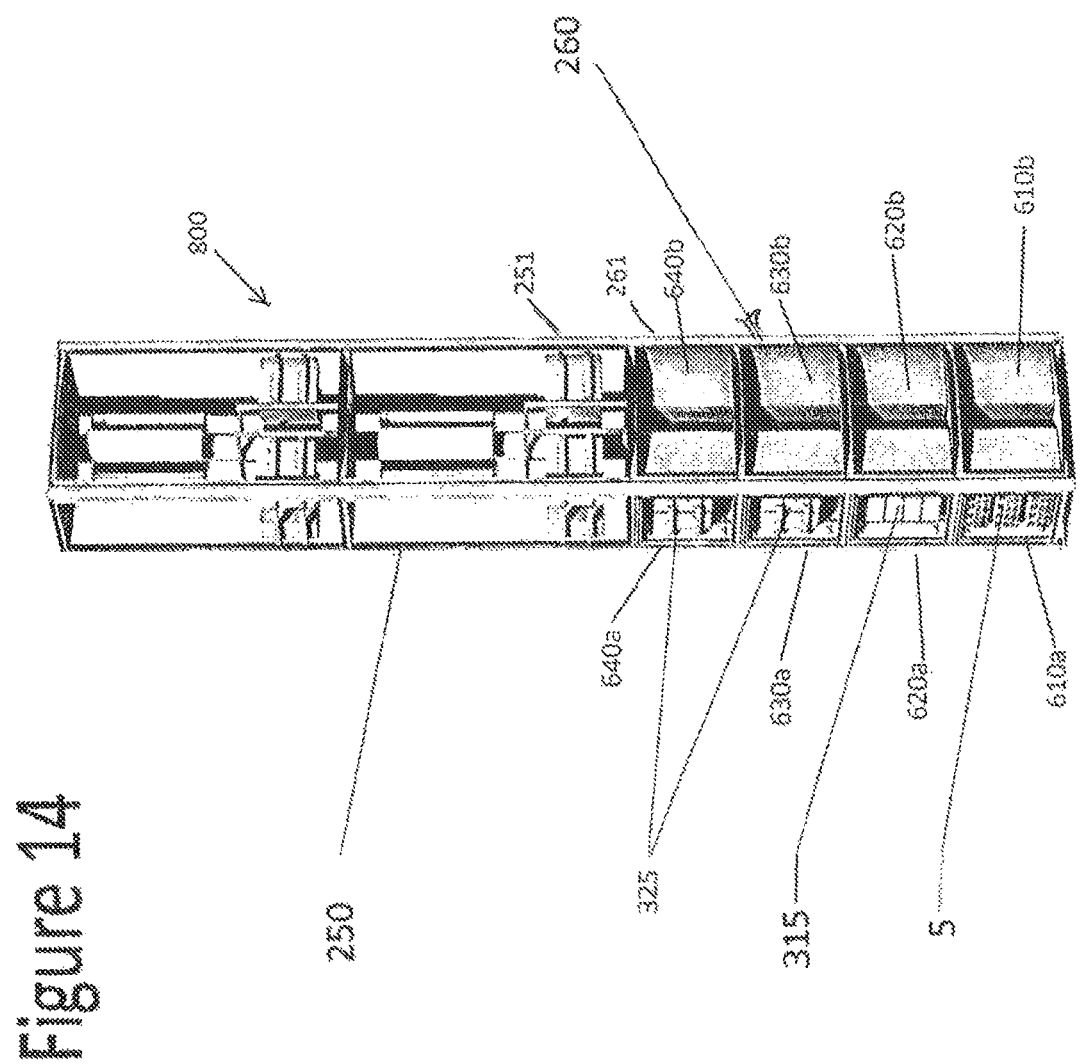
FIG. 14 is another perspective view of the alternate tower of FIG. 13 shown populated with equipment and with panels removed or opened to show underlying equipment.

FIG. 14 is a pictorial representation of the alternate tower 800 populated with equipment. Sidewalls of the sections 610, 620, 630, 640 are removed in this figure to show underlying components. In the bottom portion of the tower, power plants boxes 610*a*, 610*b*, network switching boxes 620*a*, 620*b* and boxes 630*a*, 630*b* and 640*a*, 640*b* for radio equipment racks 325 are shown. The bottom portion of the tower is supported by a frame 260 formed by columns 261, such as metal tubes or polycarbonate tubes, to provide support for the structure and to add to its structural integrity. The top frame 250 and the bottom frame 260 can be fastened or jointed together to form a continuous vertical frame.

Figure 15:
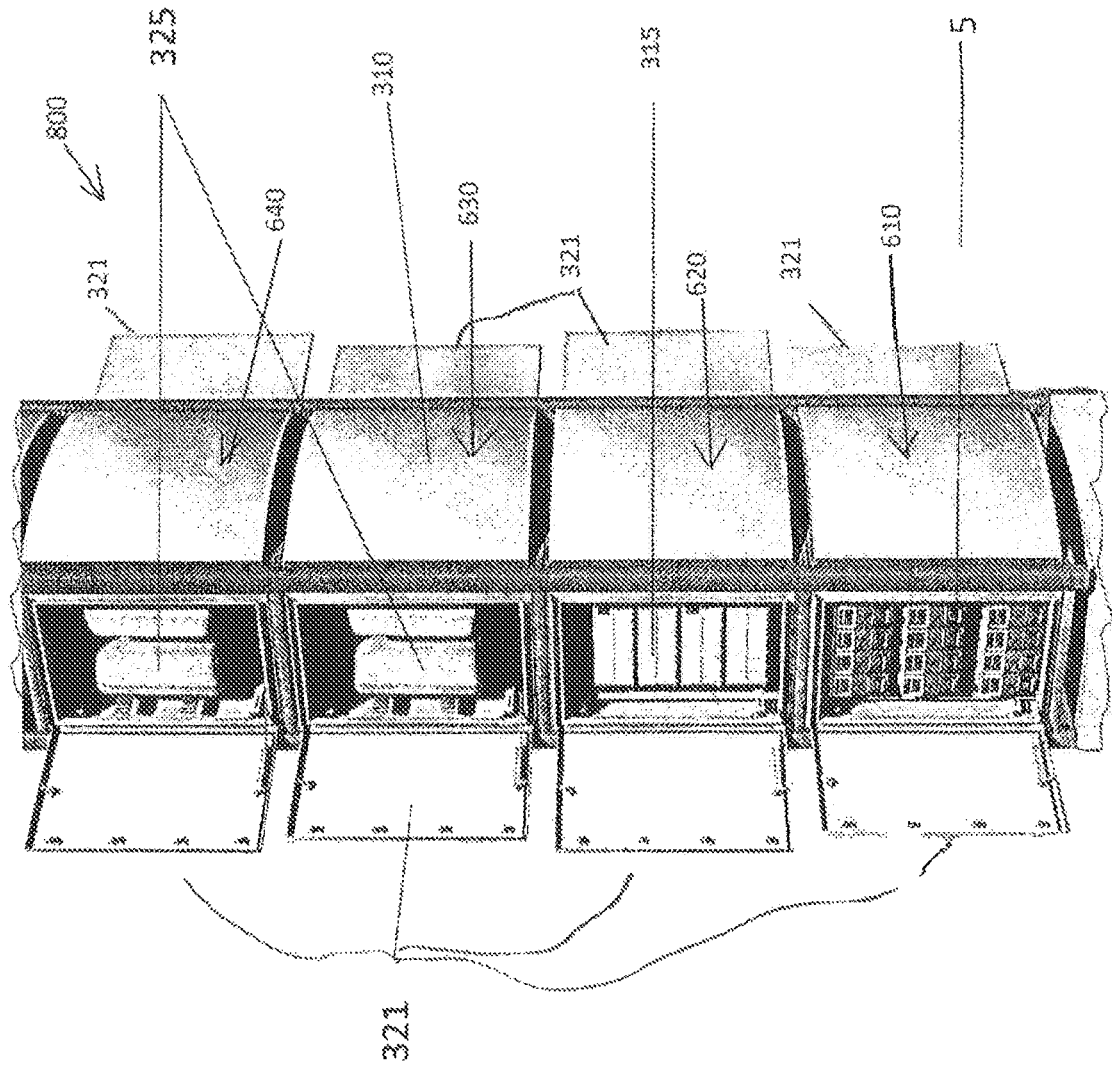
FIG. 15 is a fragmentary perspective view of a bottom portion of the alternate tower of FIG. 13 shown populated with equipment and with panels opened to show underlying equipment.

FIG. 15 is another pictorial representation of the bottom section of the tower populated with equipment. Panels 310 are shown installed over sidewalls of the sections 610, 620, 630 and 640. Power plant equipment 5, network switching equipment 315 and radio equipment racks 325 are shown mounted inside NEMA 4 enclosures 610*a*, 610*b*, 620*a*, 620*b*, 630*a*, 630*b*, 640*a*, 640*b* to provide protection against the weather elements. NEMA 4 doors 321 protect against intrusion inside the NEMA 4 enclosures 610*a*, 610*b*, 620*a*, 620*b*, 630*a*, 630*b*, 640*a*, 640*b*.

Figure 16:
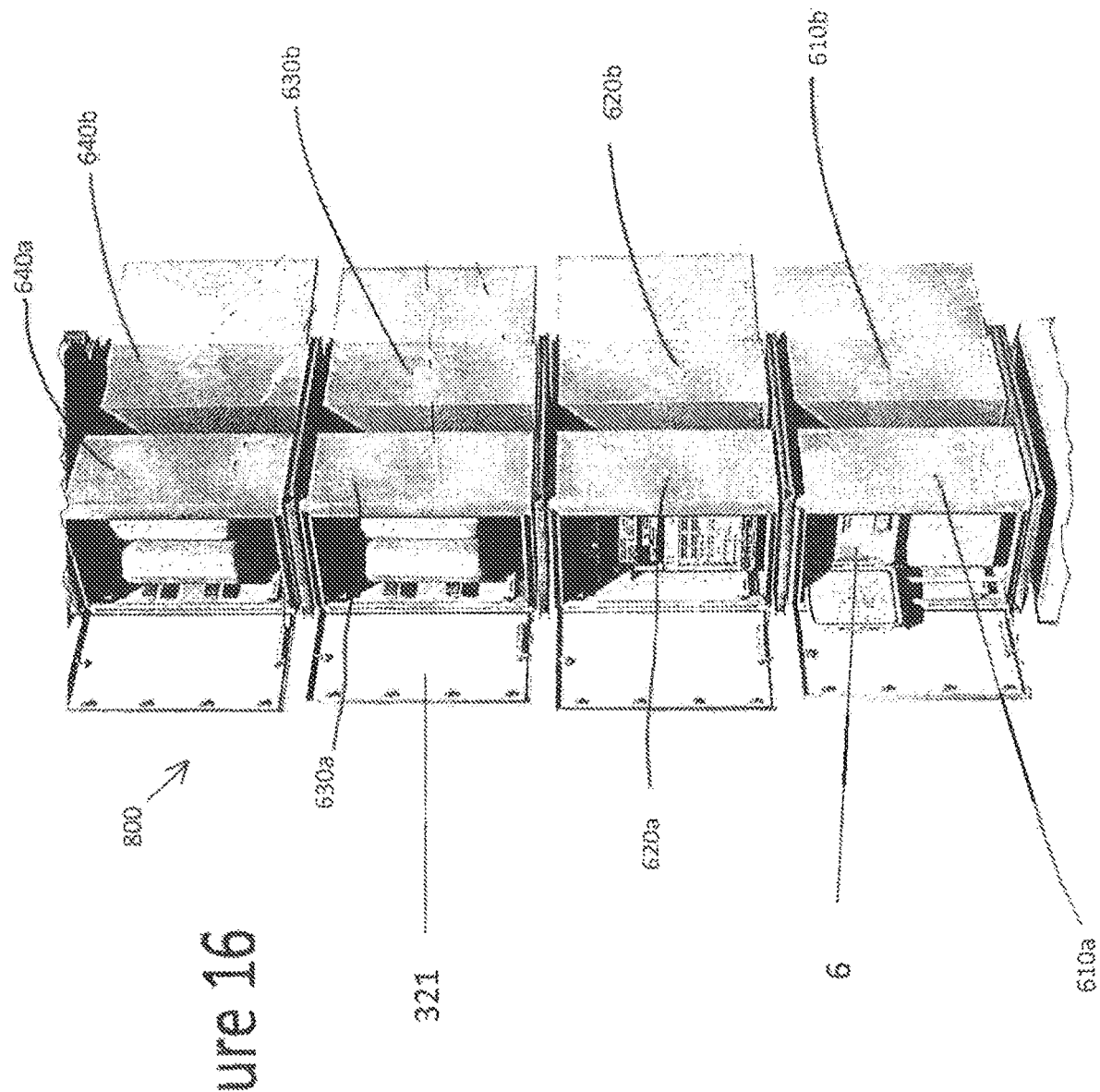
FIG. 16 is another fragmentary perspective view of a bottom portion of the alternate tower of FIG. 13 shown populated with equipment and with panels removed or opened to show NEMA enclosures mounted back to back to provide separation between provider's equipment.

FIG. 16 is a pictorial representation of the bottom section of the tower populated with equipment. Sidewalls of the sections 610, 620, 630, 640 are removed in this figure to show underlying components. It shows NEMA 4 enclosures 610*a*, 610*b*, 620*a*, 620*b*, 630*a*, 630*b*, 640*a*, 640*b* mounted inside the tower structure to provide protection against the weather elements. It also shows pairs of NEMA 4 enclosures 610*a*/610*b*, 620*a*/620*b*, 630*a*/630*b*, and 640*a*/640*b* mounted back to back to accommodate the installation of equipment, totally separating functionality from a singular operation and functionality thus providing privacy between providers that need to install different communications equipment and enjoy secrecy.

Figure 17:
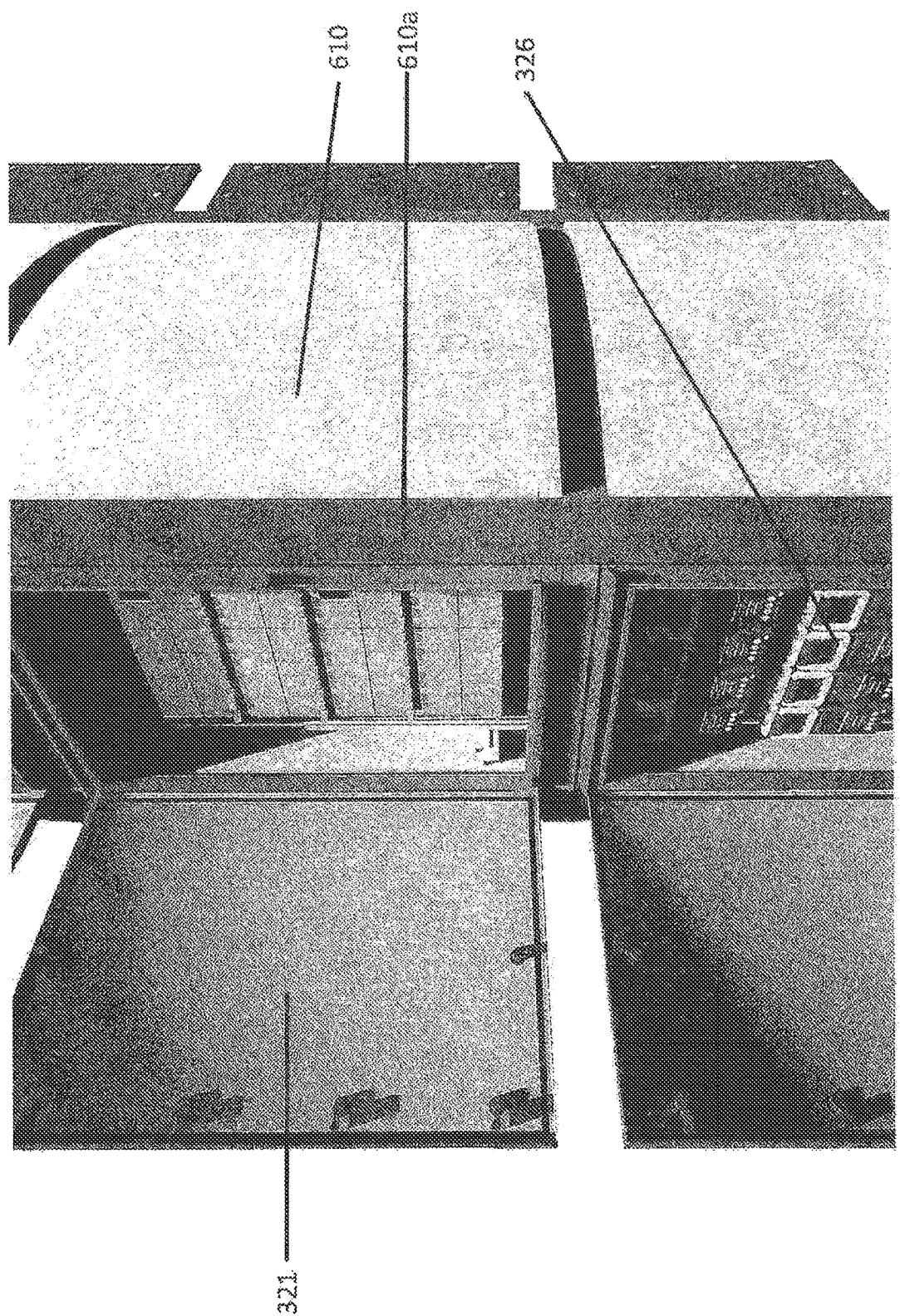
FIG. 17 is another fragmentary perspective view of a bottom portion of the alternate tower of FIG. 13 showing NEMA enclosures sliding partially outside the tower to ease maintenance.

FIG. 17 is a pictorial representation of the tower populated with equipment. The electrical box 610*a*, such as a NEMA enclosure, is shown partially slid out from the compartment 610 for servicing. A sliding mechanism 326 is shown where electrical box 610*a* slides outside the box to ease maintenance and replacement of components. The sliding mechanism can be a guide, a slide or a ball bearing, such as used to guide drawers. Alternately, only the rectangular confinement of the compartment 610 could be used to guide the horizontal sliding of the electrical box out of the compartment. All or some of the electrical boxes can be configured to be slidably removed, partially of totally from the respective compartment of the tower.

Figure 18:
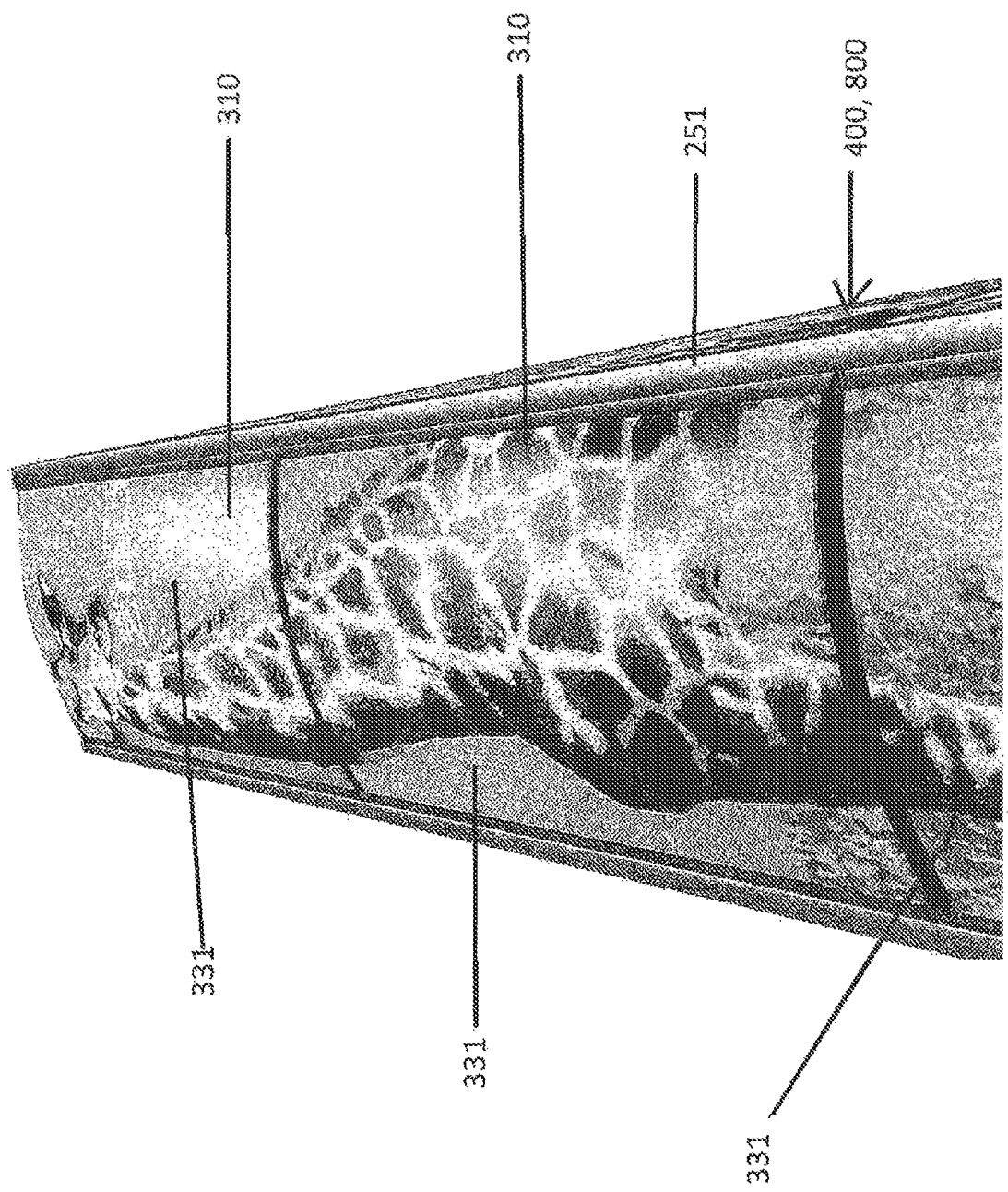
FIG. 18 is another fragmentary perspective view of the alternate tower of FIGS. 13-16 with customized panels to allow for pictorial representations to fit the venue of choice.

FIG. 18 is a pictorial representation of vinyl decorations or messages 331 glued onto panels 310 to allow for customization of the tower to the venue of choice. The panels 310 can be illuminated from within by LED or other lighting. Alternately, the decorations or messages can be displayed, not by a glued on image but by an LED display within or behind the panel that can be easily changed and controlled by electronics within the tower.

Figure 19:
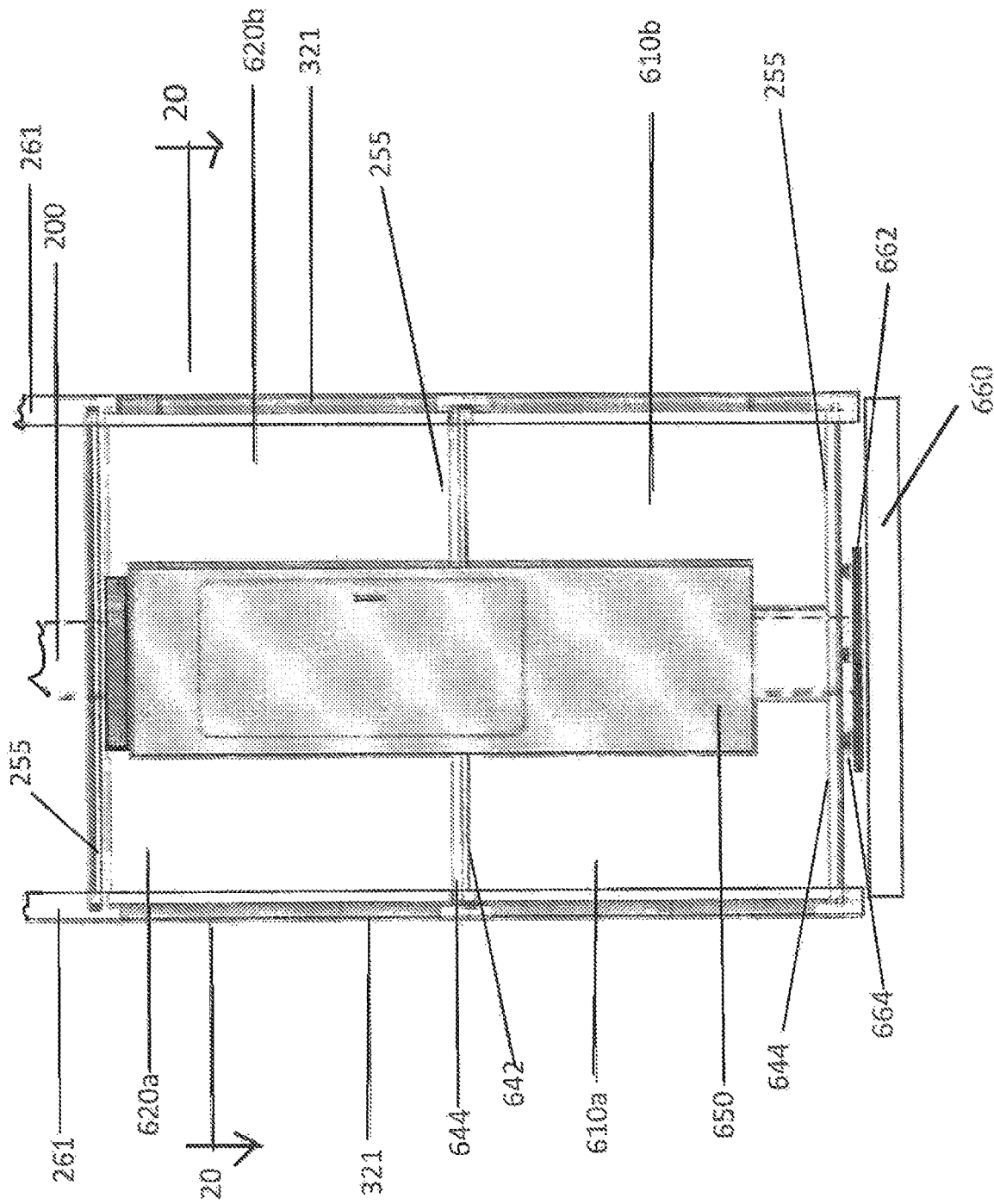
FIG. 19 is a fragmentary side view of a bottom portion of the alternate tower of FIGS. 13-16.
Figure 20:
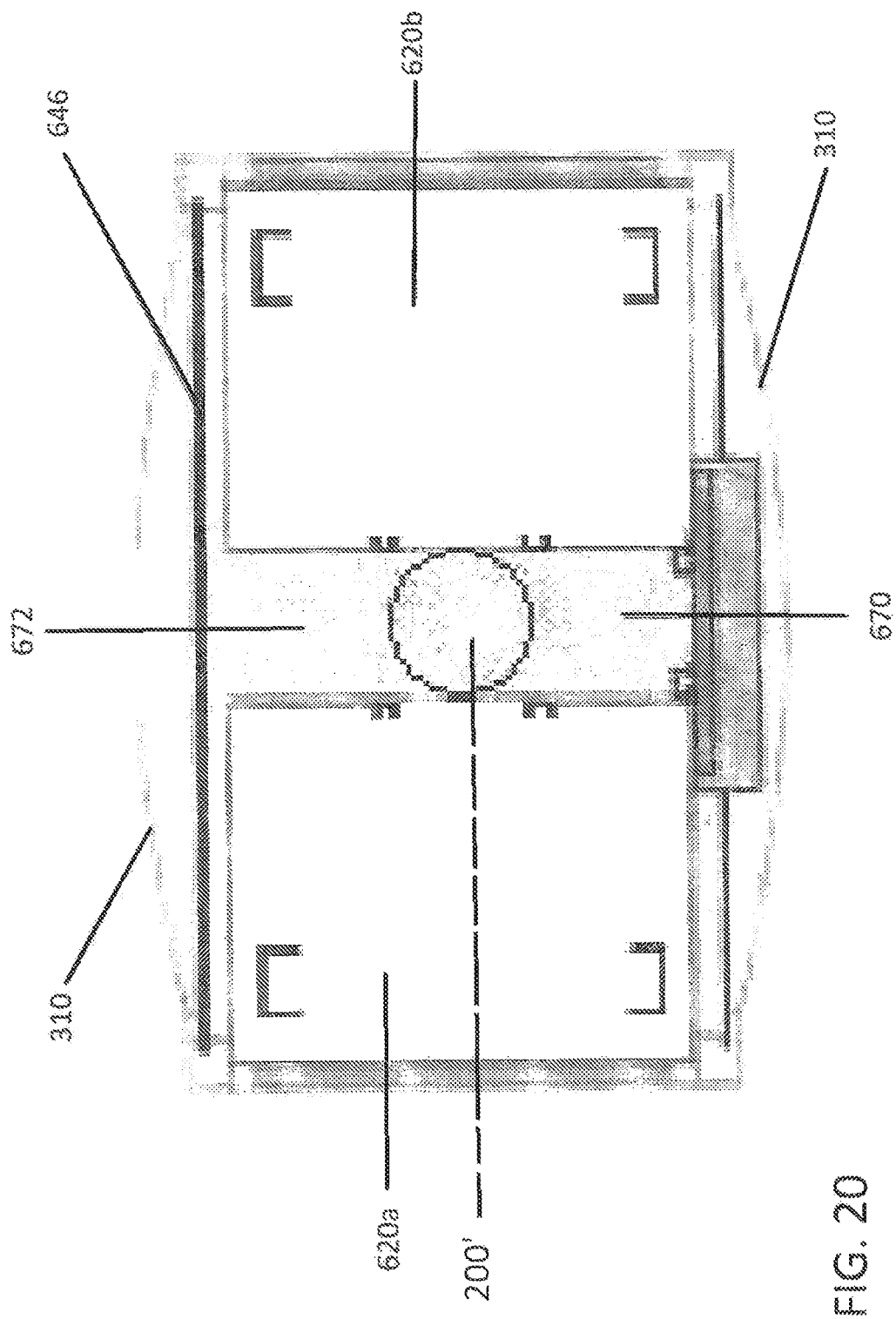
FIG. 20 is a sectional view taken generally along line 20-20 of FIG. 19.

FIGS. 19 and 20 illustrate a sectional views through a bottom portion of the tower. The horizontal frames 255 can be rectangular skeletal frames which can be integrated with or attached to the horizontal shelves, such as aluminum baffles, which define the compartments as described in the prior embodiment. Each compartment 610, 620, 630, and 640 has top and bottom walls 642, 644 defined by shelves or panels (see FIGS. 5-8) and sidewalls 646, 648. A power panel 650 is mounted to the support pole 200' and/or the compartment sidewall 648 and includes a grounding strap. The power panel for example can be a 400 A, 120/240V 1-PH LOAD CENTER. The FIGS. 19 and 20 shows compartments having front and back open faces for receiving the electrical boxes, such as the boxes 610*a*, 610*b*, 620*a*, 620*b*, 630*a*, 630*b*, 640*a*, 640*b* from either back or front of the tower.

An alternate pole 200' is attached to a concrete slab 660 via a baseplate 662 and anchor bolts 664. The pole is formed of two sections a lower section 202' and the upper section 220 as previously described. The pole 200' can be composed of steel or other suitable material. The baseplate 662 can be welded or otherwise attached to the bottom of the section 202'.

If openings are provided through the shelves separating compartments or sections, two voids or vertical pathways 670, 672 are present between the sidewalls 646, 648, the pole 200' and the back walls of the electrical boxes 610*a*, 610*b*, 620*a*, 620*b*, 630*a*, 630*b*, 640*a*, 640*b*. These voids are advantageously used for air circulation for cooling and for routing cabling.

The decorative panels 310 as previously described attach over the tower sidewalls 646, 648 and can also be attached to cover the front and back of the tower (not shown) to cover the doors 321 of the electrical boxes.

Figure 21:
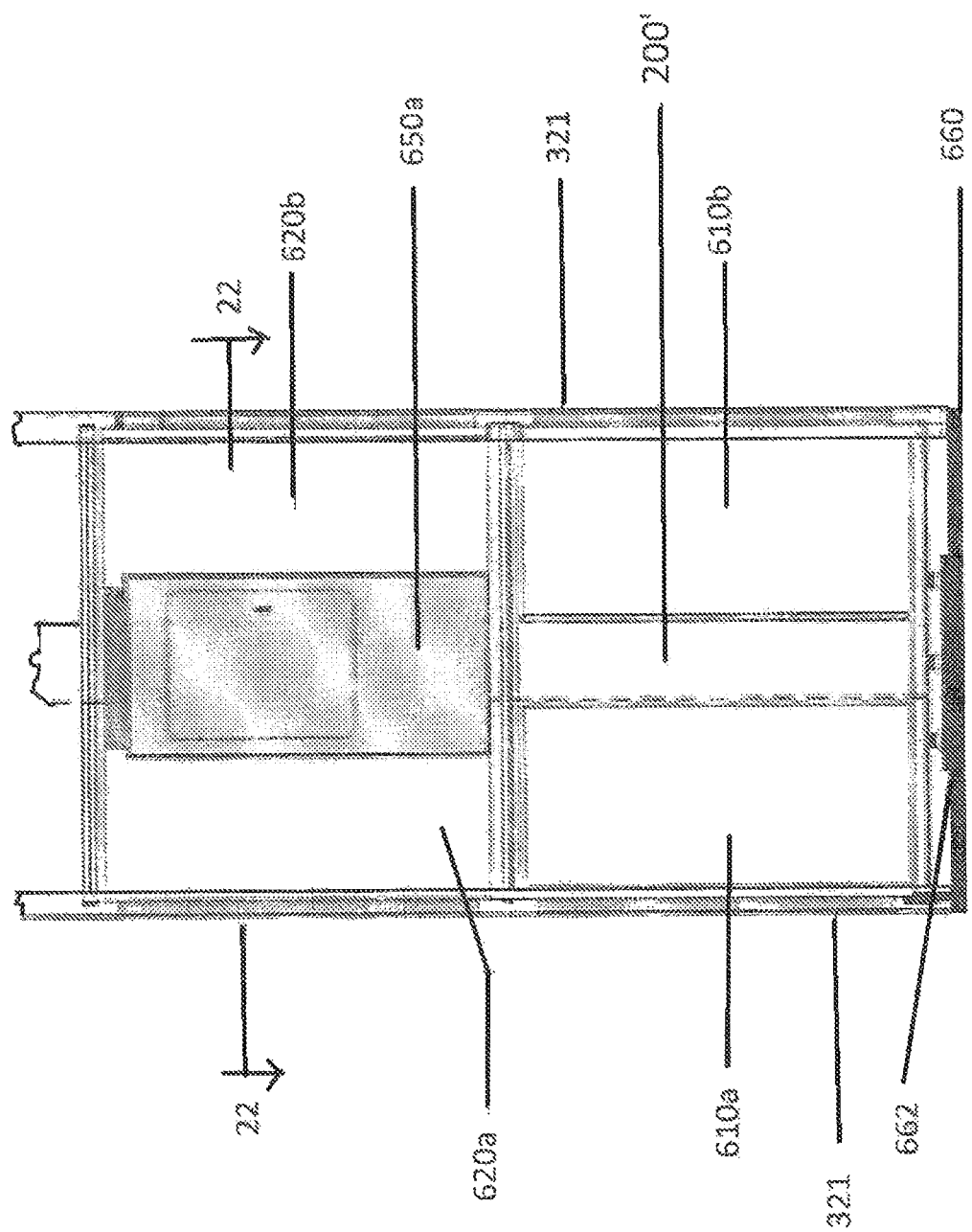
FIG. 21 is a fragmentary side view of an alternate bottom portion of the alternate tower of FIGS. 13-16.
Figure 22:
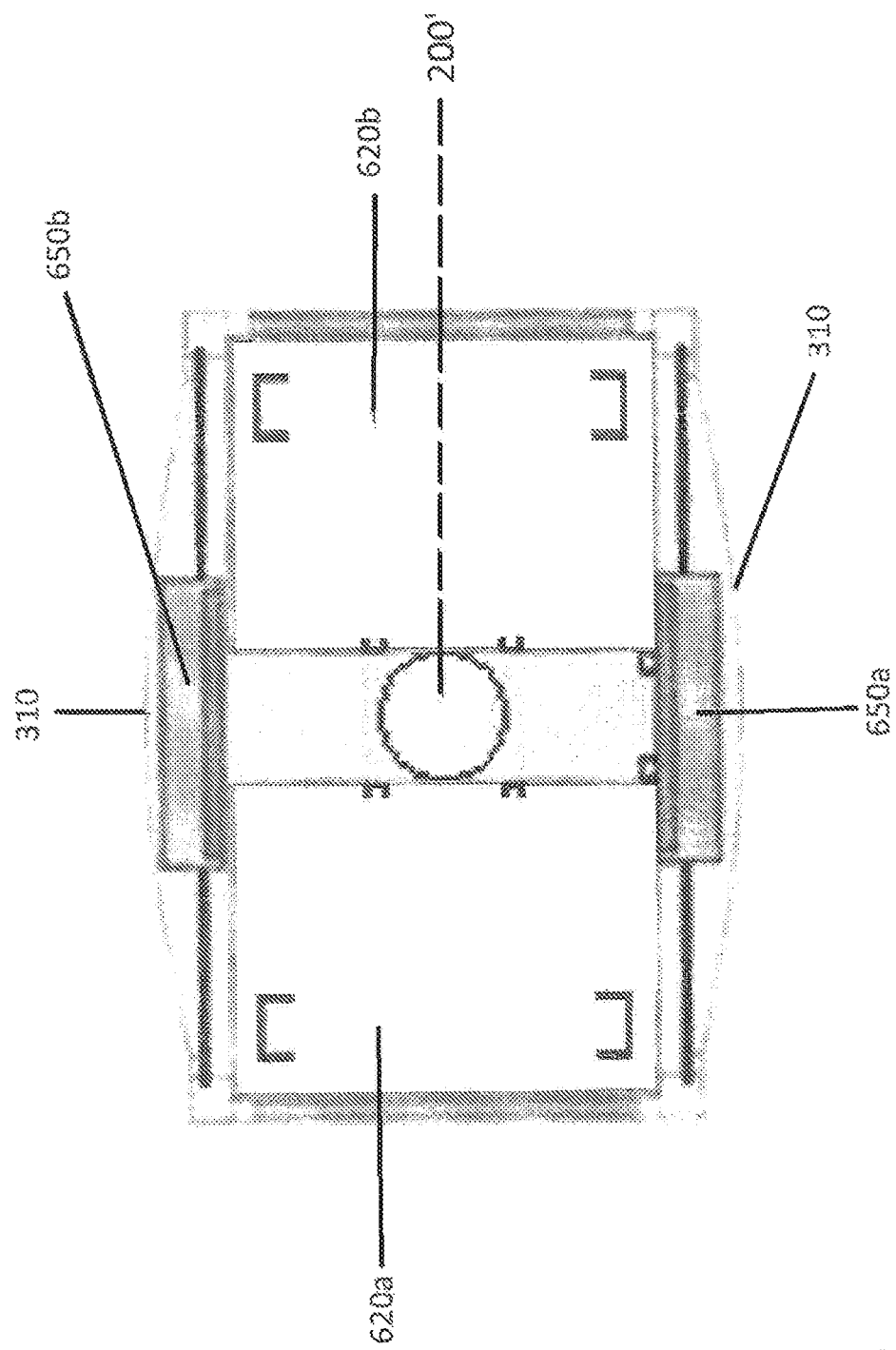
FIG. 22 is a sectional view taken generally along line 22-22 of FIG. 21.

FIGS. 21 and 22 illustrate an alternate to FIGS. 19 and 20, identical except that two power panels 650*a*, 650*b* are used, one on each side of the tower, both attached to respective sidewalls 646, 648 and the pole 200' and covered by panels 310.

FIG. 23A-23F describe one method of installation. First (FIG. 23A), foundation or slab 660 is poured in or on the ground with the anchor bolts 664. Next, the baseplate 662, attached to the pole section 202' is attached to the slab 660 via the anchor bolts 664 FIG. 23B). Next, a bottom section of the tower is assembled using the vertical frame, spaced-apart horizontal frames 255 and shelves (FIG. 23C, FIG. 23D is a side view). The sidewalls 646, 648 for each compartment are installed, which when combined with the shelves, defines each section or compartment. The frames 255 and the shelves are attached to the pole 200', the frame 260 is attached to the frames 255. Cabling is run throughout the tower and the electrical equipment, such as NEMA boxes or other components are installed into the dedicated sections or compartments. Next, the second pole section 220 is attached to the first pole section 202' (FIG. 23E, FIG. 23F is a side view) and the horizontal frames 255 and the vertical frame 250 for the upper section is built up using the same procedure, with the vertical frame 250 fastened to the lower vertical frame 260.

FIG. 24 shows an Edge Networking configuration 1000 for a mobile cellular network with the utilization of the smart tower 400 or 800 as an Edge Networking Administrator allocating resources and supporting a multiplicity of small cells providing networking and power back-up. A core cellular network 1010 communicates to a mobile switching center 1016 which can be linked by fiber optic cable or point to point wireless to the smart tower 400, 800 which can be located near to the edge of the network. The smart tower 400, 800 can then communicate cellular data wirelessly of by fiber optic cable to small cells 1024 and/or to a remote radio head 1028 to serve cellular users beyond the edge of the network. The remote radio heads converts light signal to RF signals while the small cells provide full in coverage to mobile users.

The system of FIG. 24 provides for newer technologies, such as 5G, and more advanced edge network implementations to have more radio resources brought out at the street level. Resources are deployed where resources can be easily managed. The system provides a dedicated space to house most of the BSS elements and some of the traditional cell site elements into a dedicated space in a tower in close proximity to the edge of the network.

The embodiment of the invention moves resources from inside buildings to outdoor locations much closer to the edge of the network.

The smart tower can replace current smart city solutions by an integrated unit. The exemplary embodiment of the present invention can provide a multifaceted apparatus which establishes the fundamental elements of a mobile communications network node. Specifically, this mobile communications network can utilize a variety of cellular technology solutions such as macro, mini, micro, small cell equipment with antennas mounted at, or near, the highest point of the tower through which a cellular and Wi-Fi signal may be maintained for voice and data. In addition, the mobile communications network can be coupled with smart city applications allowing for cellular and Wi-Fi communications in a variety of ways including, but not limited to, Internet access, phone calls, security monitoring, urban wayfinding, providing environmental sensor information, such as to city utilities, etc.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. A telecommunications tower comprising:
   a ground-supported pole extending vertically along a pole axis;
   a scaffold frame supported by the ground-supported pole, the scaffold frame comprising a plurality of vertical frame portions extending vertically along respective vertical frame axes positioned radially outward from the pole axis, the plurality of vertical frame portions bounding an interior space extending radially inward from the respective vertical frame axes toward the pole axis, and a plurality of horizontal frame portions extending horizontally between and interconnecting the plurality of vertical frame portions;
   a plurality of shelves coupled with the scaffold frame and extending horizontally on respective horizontal shelf planes, the plurality of shelves dividing the interior space into a plurality of vertically arranged compartments, a first one of the plurality of compartments containing an antenna, a second one of the plurality of compartments positioned vertically below first one of the plurality of compartments containing a radio communications component communicatively coupled with the antenna; and
   a plurality of exterior panels coupled with the scaffold frame and covering the plurality of compartments.

2. The telecommunications tower of claim 1, wherein the radio communications component is communicatively coupled with the antenna by first cabling passing through a first opening defined in a first one of the plurality of shelves intermediate the first one of the plurality of compartments and the second one of the plurality of compartments.

3. The telecommunications tower of claim 2, wherein the radio communications component is provided in a weather protected box provided in the second one of the plurality of compartments.

4. The telecommunications tower of claim 2, wherein a third one of the plurality of compartments positioned vertically below the second one of the plurality of compartments contains a network switching component communicatively coupled with the radio communications component.

5. The telecommunications tower of claim 4, wherein the network switching component is provided in a second weather protected box provided in the third one of the plurality of compartments.

6. The telecommunications tower of claim 4, wherein the network switching component is communicatively coupled with the radio communications component by second cabling passing through a second opening defined in a second one of the plurality of shelves intermediate the second one of the plurality of compartments and the third one of the plurality of compartments.

7. The telecommunications tower of claim 4, wherein a fourth one of the plurality of compartments positioned vertically below the third one of the plurality of compartments contains a power panel component electrically coupled with and configured to power the radio communications component and the network switching component.

8. The telecommunications tower of claim 1, wherein the radio communications component is configured as a cellular radio communications component.

9. The telecommunications tower of claim 1, wherein the radio communications component is configured as a Wi-Fi radio communications component.

10. The telecommunications tower of claim 1, wherein the ground-supported pole is coupled with a foundation provided in the ground via one or more anchor bolts.

11. The telecommunications tower of claim 10, wherein the one or more anchor bolts are coupled with a base plate and the base plate is coupled with the ground-supported pole.

12. The telecommunications tower of claim 1, wherein the ground-supported pole extends from a lower connection with the ground through the interior space and through at least a portion of the first one of the plurality of compartments containing the antenna.

13. The telecommunications tower of claim 1, wherein the antenna is directly supported by the ground-supported pole.

14. The telecommunications tower of claim 1, wherein one or more of the plurality of exterior panels is removably coupled with the scaffold frame.

15. The telecommunications tower of claim 1, wherein one or more of the plurality of exterior panels is illuminated by a light source internal to the telecommunications tower.

16. The telecommunications tower of claim 1, wherein one or more the plurality of exterior panels is coupled with the scaffold frame by a hinged mechanism to provide an access door configured to open and close to selectably provide access to one or more of the plurality of compartments.

17. The telecommunications tower of claim 1, wherein one or more the plurality of exterior panels comprises an LED display panel configured to be selectively changed by electronics within the telecommunications tower.

18. A method of constructing a telecommunications tower comprising:
   coupling a pole with the ground such that the pole extends vertically along a pole axis;
   coupling a scaffold frame with the pole such that a plurality of vertical frame portions of the scaffold frame extend vertically along respective vertical frame axes positioned radially outward from the pole axis and bound an interior space extending radially inward from the respective vertical frame axes toward the pole axis and a plurality of horizontal frame portions extend horizontally between and interconnect the plurality of vertical frame portions;

coupling a plurality of shelves with the scaffold frame so that the plurality of shelves extend horizontally on respective horizontal shelf planes and divide the interior space into a plurality of vertically arranged compartments;

providing an antenna in a first one of the plurality of compartments;

providing a radio communications component in a second one of the plurality of compartments positioned vertically below the first one of the plurality of compartments;

communicatively coupling the radio communications component with the antenna; and coupling a plurality of exterior panels with the scaffold frame to cover respective sides of the plurality of compartments.

19. The method of claim 18, wherein the providing the antenna in the first one of the plurality of compartments includes coupling the antenna with the pole.

20. The method of claim 18, wherein the providing the radio communications component in the second one of the plurality of compartments includes providing the radio communications component in a weather proof box and supporting the weather proof box in the second one of the plurality of compartments with one or both of the pole and one of the plurality of shelves.

21. The method of claim 18, wherein the coupling the pole with the ground includes coupling one or more anchor bolts with a base plate coupled with the pole.

22. The method of claim 18, wherein the coupling the plurality of shelves with the scaffold frame comprises coupling the plurality of shelves with respective ones of the plurality of horizontal frame portions.

* * * * *